(12) United States Patent
White et al.

(10) Patent No.: US 9,714,085 B2
(45) Date of Patent: Jul. 25, 2017

(54) MONITORING OF WIND TURBINES

(75) Inventors: Jonathan R. White, Sylvania, OH (US); Douglas E. Adams, West Lafayette, IN (US); Josh Paquette, Bosque Farms, NM (US)

(73) Assignee: Purdue Research Foundation, West Lafayette, IN (US)

( * ) Notice: Subject to any disclaimer, the term of this patent is extended or adjusted under 35 U.S.C. 154(b) by 1064 days.

(21) Appl. No.: 12/992,804

(22) PCT Filed: May 13, 2009

(86) PCT No.: PCT/US2009/043856
§ 371 (c)(1),
(2), (4) Date: Feb. 24, 2011

(87) PCT Pub. No.: WO2009/140435
PCT Pub. Date: Nov. 19, 2009

(65) Prior Publication Data
US 2011/0150649 A1    Jun. 23, 2011

Related U.S. Application Data

(60) Provisional application No. 61/052,848, filed on May 13, 2008.

(51) Int. Cl.
F03D 7/04 (2006.01)
B64C 27/00 (2006.01)
F03D 17/00 (2016.01)

(52) U.S. Cl.
CPC ............ *B64C 27/006* (2013.01); *F03D 17/00* (2016.05); *F05B 2250/71* (2013.01);
(Continued)

(58) Field of Classification Search
CPC ... F03D 11/0091; F03D 17/00; B64C 27/006; F05B 2270/1095; F05B 2250/71;
(Continued)

(56) References Cited

U.S. PATENT DOCUMENTS 6,940,185 B2    9/2005    Andersen
6,940,186 B2    9/2005    Weitkamp
(Continued)

FOREIGN PATENT DOCUMENTS

EP    1075600    2/2001
WO    9957435    11/1999

OTHER PUBLICATIONS

Abdallah Imad, "Advanced load alleviation for wind turbines using adaptive trailing edge geometry: sensoring techniques," (Jul. 13, 2006), XP55026626, retrieved from the Internet May 9, 2012, http://www.risoe.dtu.dk/rispubl/art/Final Thesis Report_imad.pdf Jul. 13, 2006.
(Continued)

*Primary Examiner* — Christopher Verdier
(74) *Attorney, Agent, or Firm* — John V. Daniluck; Bingham Greenebaum Doll LLP

(57) ABSTRACT

Method and apparatus for determining the deflection or curvature of a rotating blade, such as a wind turbine blade or a helicopter blade. Also, methods and apparatus for establishing an inertial reference system on a rotating blade.

22 Claims, 17 Drawing Sheets

(52) U.S. Cl.
CPC . *F05B 2260/821* (2013.01); *F05B 2270/1021* (2013.01); *F05B 2270/1095* (2013.01); *F05B 2270/33* (2013.01); *F05B 2270/807* (2013.01)

(58) Field of Classification Search
CPC ........ F05B 2270/807; F05B 2270/1021; F05B 2260/821; F05B 2270/33
USPC ........ 416/1, 31, 61; 702/141, 142, 145, 184, 702/185; 73/865.9
See application file for complete search history.

(56) References Cited

U.S. PATENT DOCUMENTS

| | | | |
|---|---|---|---|
| 7,246,991 | B2 | 7/2007 | Bosche |
| 2004/0057828 | A1 | 3/2004 | Bosche |
| 2006/0140761 | A1* | 6/2006 | LeMieux ........................ 416/61 |

OTHER PUBLICATIONS

Erik Gross, "Application of Damage Detection Techniquest using Wind Turbine Model Data," XP55026870, Retrieved from the Internet May 10, 2012, http://windpower.sandia.gov/other/982823c.pdf Dec. 31, 1998.

Douglas Adams, et al. "Structural health monitoring of wind turbines: method and application to a HAWT," presented at American Wind Energy Association (AWEA) WINDPOWER Conference & Exhibition, May 24-27, 2010.

Noah J. Myrent, et al., "Pitch Error and Shear Web Disbond Detection on Wind Turbine Blades for Offshore Structural Health and Prognostics Management", presented at American Institute of Aeronautics and Astronautics 54th Structures, Structural Dynamics, and Materials Conference, Apr. 8-11, 2013.

International Search Report, PCT/US2009/043856, mailed Jul. 9, 2009.

Extended European Search Report, EP 09747518, mailed May 18, 2012.

International Preliminary Report on Patentability, PCT/US2009/043856, completed Sep. 13, 2010.

Written Opinion of the International Searching Authority, PCT/US2009/043856, mailed Jul. 9, 2009.

European Patent Office Communication issued in EP Patent Application No. 09747518.0. Jun. 6, 2012.

Response to European Patent Office Communication filed in EP Patent Application No. 09747518.0. Dec. 17, 2012.

Office Action, EP 09747518 Jul. 17, 2014.

Office Action Canadian Application 2724311, 4 pages Jun. 11, 2015.

Canadian Application 2724311, 2nd Office Action dated Apr. 4, 2016, 3 pages.

* cited by examiner

MONITORING OF WIND TURBINES

PRIORITY CLAIM

This application is a national stage filing of PCT Patent Application Serial No. PCT/US2009/043856, filed May 13, 2009, and titled MONITORING OF WIND TURBINES, which claims the benefit of priority to U.S. Provisional Patent Application Ser. No. 61/052,848, filed May 13, 2008 and titled MODAL ANALYSIS OF WIND TURBINES, both of which are incorporated herein by reference.

GOVERNMENT RIGHTS

This invention was made with government support under contract number DE-AC04-94AL85000 awarded by the Department of Energy. The government has certain rights in the invention.

FIELD OF THE INVENTION

The present invention pertains to analysis of structures, and in particular to static and dynamic analysis of wind turbines.

BACKGROUND OF THE INVENTION

In 2008 the U.S. installed 8,358 MW of new wind capacity making wind energy the fastest growing source of renewable energy. The total U.S. installed wind power increased to 25,170 MW Germany with 23,902 MW of wind energy was surpassed by the U.S. as the largest producer of wind power in the world. The installation of wind turbines accounted for 42% of all new energy capacity installed in the United States. 5.5 million homes can now be served by the wind energy produced in the U.S.

Each of these installed wind turbines represent a significant investment and a significant resource. As the population of wind turbines increases and ages, malfunctions can be expected to occur. If such malfunctions can be predicted prior to happening, then the wind turbine can be shut down before expensive damage occurs. Further, the local power utility company may be afforded an opportunity to plan for the shutdown of this resource and the need to replace it while the wind turbine is out of commission.

Some goals of a wind turbine rotor health monitoring system can include: (1) estimate mechanical loading, and (2) monitor damage. Estimation of the turbine input could lead to more efficient rotor control and aid in future blade design. Knowledge of the damage state would allow for planned maintenance and avoid catastrophic failure.

Some of the various embodiments of the present invention described and claimed hereafter show novel and nonobvious ways of improving a wind turbine.

SUMMARY OF THE INVENTIONS

Some aspects of the inventions disclosed herein pertain to methods for establishing an inertial reference on a rotating system from one or more relative (i.e., non-inertial) measurements of a rotating member.

Yet other aspects of some embodiments of the present inventions pertain to the use of a function to predict geometry of a rotating member. As one example, the predicted geometry can be the lateral deflection of the member. The function can include one or more unknown coefficients, each of which multiplies a different term within the function. In some embodiments, a derivative of the function is calculated, and measured data is used to calculate the unknown coefficients as they are expressed in the derivative. The same coefficients can be used in the function to predict the geometry of the member.

One aspect of some embodiments of the present invention pertains to a method of predicting the deflection of a rotating member. The method further includes providing a rotating member attached to a rotatable hub, and a sensor attached to the member along the length. Certain embodiments include an end of the rotating member attached to the hub such that the slope of the member at the hub is about zero during rotation. Some embodiments include expressing the deflection of the member as a function of the length of the member, the function including at least one unknown coefficient. Yet other embodiments include taking a derivative of the function with respect to length, the derivative including the unknown coefficient or at least two unknown coefficients. In further embodiments, the function is a series expansion having an order greater than one or an order greater than two. Still other embodiments include measuring a response of the member with a sensor during rotation, using the response to calculate the coefficient or coefficients. Yet further embodiments include converting the measured response by at least one of time-based filtering or numerical scaling.

Another aspect of some embodiments of the present invention pertains to a method of determining the slope of a rotating member. The method further includes providing a flexible member attached to a rotatable hub, with one end being free to deflect. A sensor provides a measurement of velocity or acceleration of the member. Yet other embodiments include attaching the sensor to the member at a predetermined station along the length. Still further embodiments include rotating the hub and attached member, measuring velocity or acceleration during said rotating, and calculating a vector of centripetal acceleration from the measurement. Some aspects of the invention include calculating the slope at the predetermined station from orientation of the vector relative to the direction of measurement.

Yet another aspect of some embodiments of the present invention includes a method of determining the bending of a rotating member. The method further includes providing a flexible member attached to a rotatable hub with the other end being free to deflect. A sensor provides a signal aligned with a measurement direction and capable of providing data corresponding to centripetal acceleration of the sensor. Some embodiments include attaching the sensor to the member along the length such that the measurement direction stays in a fixed orientation relative to the bending member. Some aspects of the invention include calculating a vector of centripetal acceleration from the sensor data and calculating the slope at the predetermined station from the orientation of the vector relative to the direction of measurement.

Another aspect of the present invention includes a wind turbine having a plurality of blades each attached to a rotating hub. Some embodiments include an acceleration sensor attached to one of said blades and providing a plurality of signals, each signal corresponding to acceleration in a different direction. Yet other embodiments include a computer receiving the plurality of signals from the sensor. Still further embodiments include a software algorithm using the signals to calculate a vector of centripetal acceleration during rotation of the hub and blade. The algorithm determines the angular offset from the calculated vector to at least one of said signals.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

BRIEF DESCRIPTION OF THE DRAWINGS

FIG. 5b is a schematic representation of wind loading and the resultant deflection in the blade of FIG. 5a.

DESCRIPTION OF THE PREFERRED EMBODIMENT

Figure 1A:
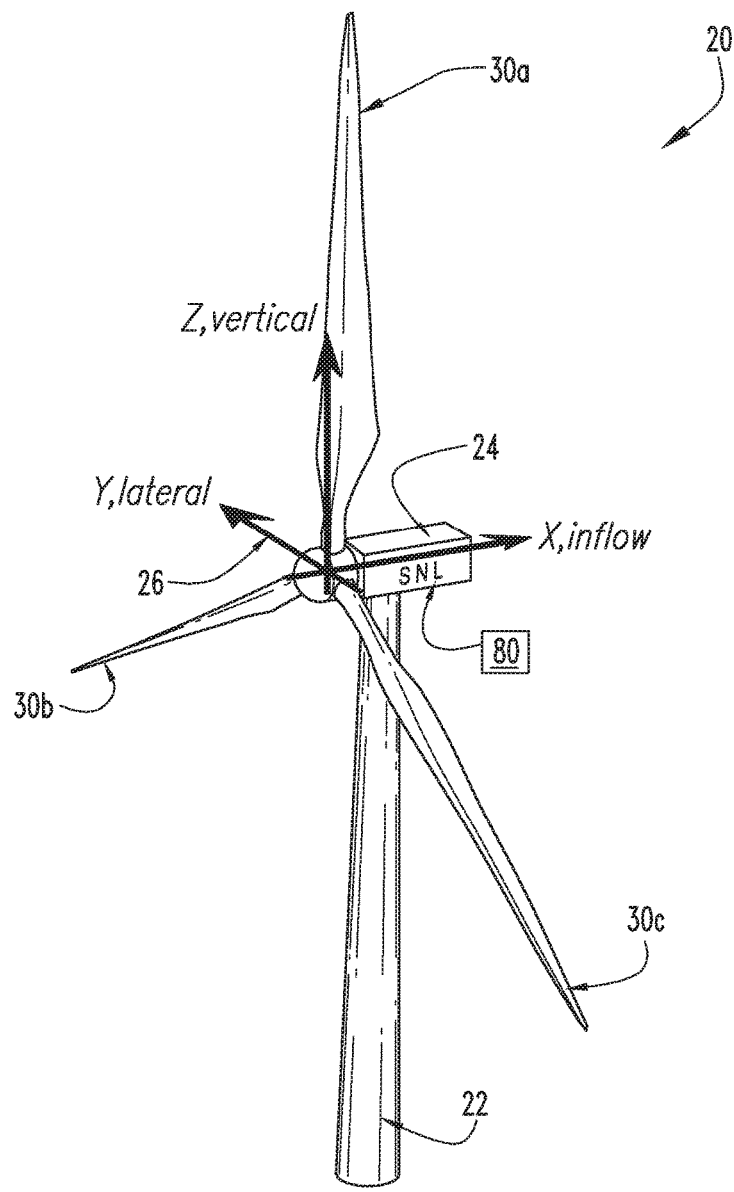
FIG. 1a is a perspective drawing of a wind turbine according to one embodiment of the present invention.
Figure 1B:
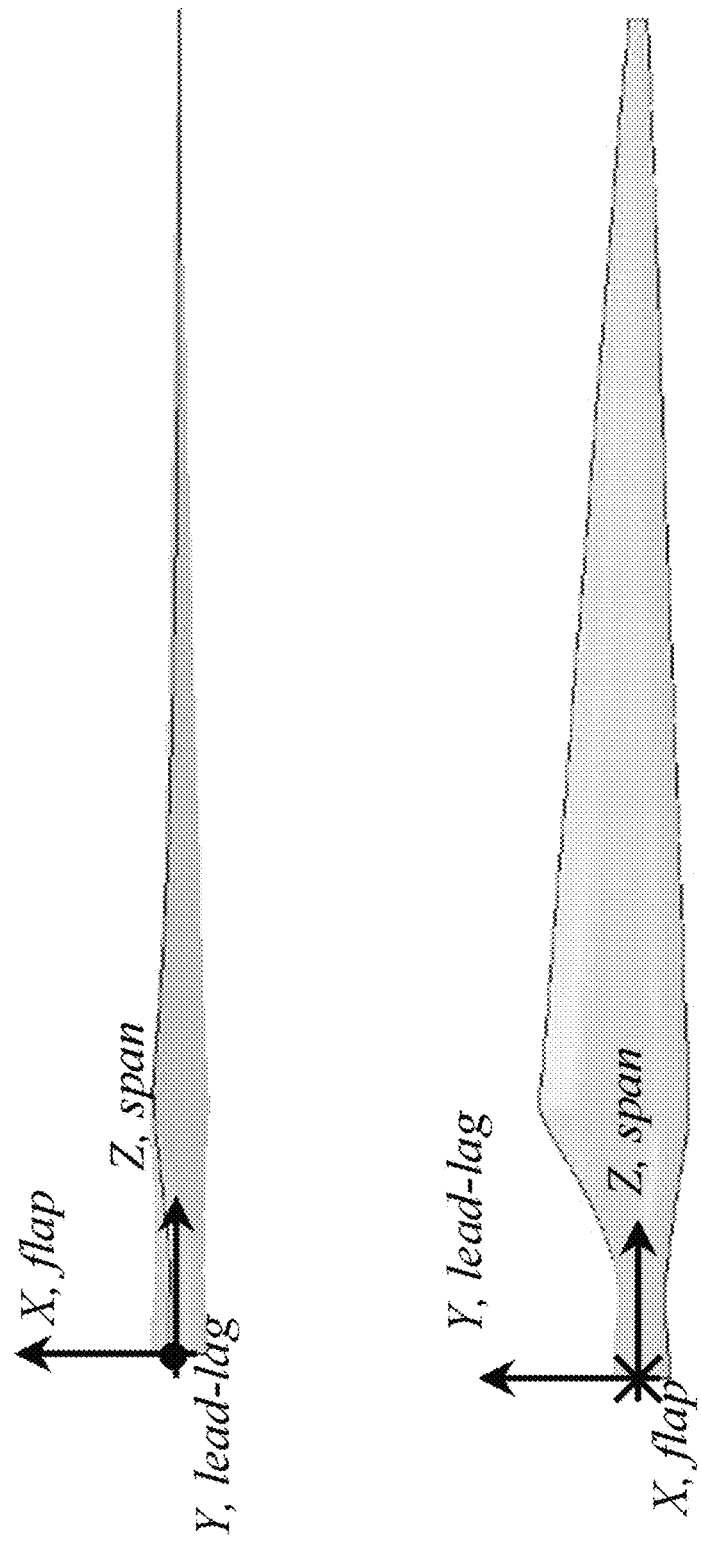
FIG. 1b shows graphical representation of a coordinate system used in this document.
Figure 1C:
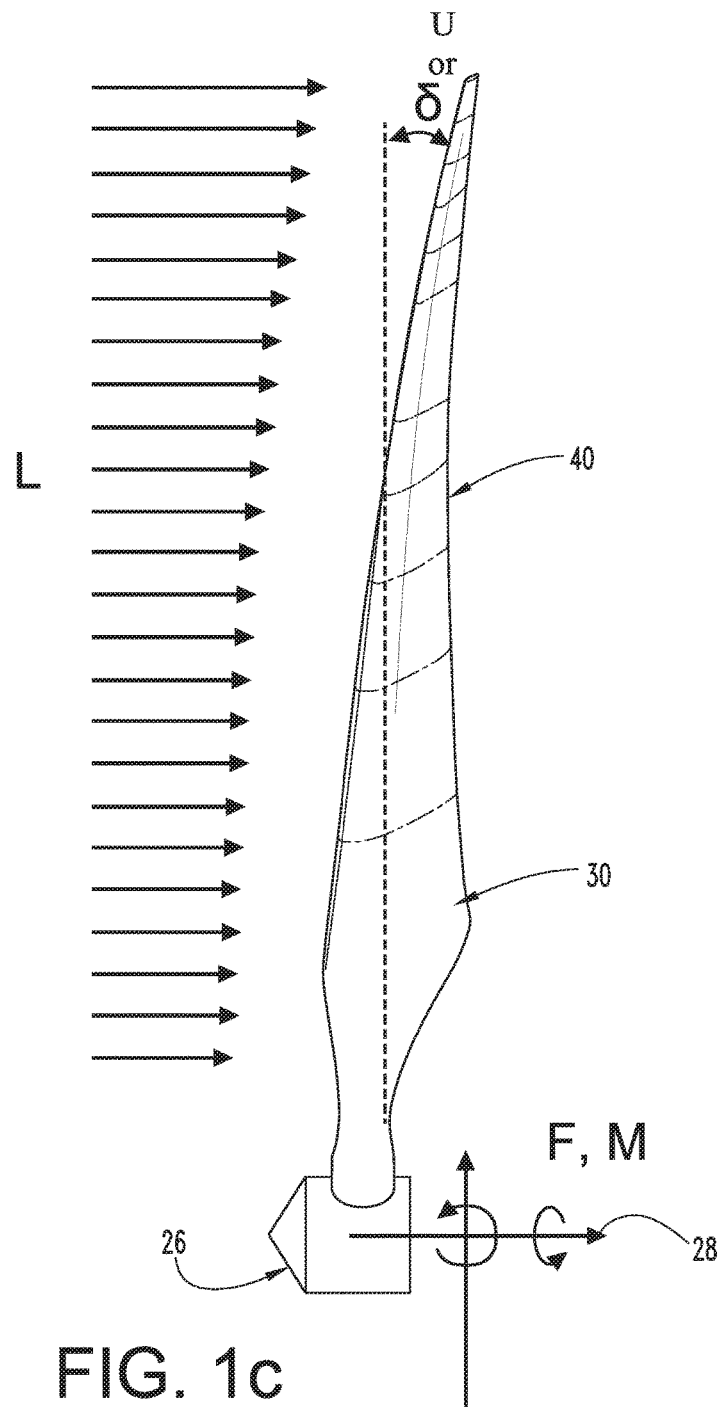
FIG. 1c is a graphical depiction showing the turbine blade loading (L) that causes a deflection (δ) and resulting hub forces (F) and moments (M), on a turbine blade according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that must be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only. Further, discussion pertaining to a specific composition of matter, that description is by example only, does not limit the applicability of other species of that composition, nor does it limit the applicability of other compositions unrelated to the cited composition.

Although wind turbines are becoming a mature and serious contributor to the production of power, there is still much potential to further improve the design, control and performance of turbines. Sandia National Laboratories Wind Energy Technology Department (SNL) is currently developing technologies to produce an advanced smart rotor blade. One vision of this program is a rotor blade that can (1) detect the loading produced by the wind, (2) estimate the transfer of these loads to the gearbox, (3) estimate the backlash loads from the drive-train to the rotor blade, (4) adapt the rotor blade aerodynamics with microtabs, ailerons or fast pitch actuators to increase load at low wind speed and shed load at high wind speed, (5) calculate the accumulation of dynamic fatigue cycles, (6) detect damage throughout the blade and (7) verify design specifications and predicted performance.

Various embodiments of the invention presented herein pertain to technology to fulfill some of these requirements, specifically to estimate the loading to the blade, provide an observer for the control system and monitor damage accumulation. Few attempts have been made in previous work to accomplish these goals with inertial sensors, namely accelerometers, as presented in this work. Inertial sensors have the benefit of directly measuring acceleration, the physical variable used in the equations of motion of structural dynamic systems. Some of the challenges of implementing accelerometers include: the signal processing of the higher-order measurement, relationship between the dynamics of the structure and the sensor data, constraints imposed by the performance characteristics of accelerometers, the effects of orientation on the acceleration data, and the estimation of static loading with a dynamic measurement. Various embodiments of the inventions shown herein offer novel and nonobvious approaches developed to overcome these challenges.

One technology to improve the efficiency of wind turbines is the use of smart rotor blades, which can monitor the physical loads being applied by the wind and then adapt the airfoil for increased energy capture. For extreme wind and gust events, the airfoil could be changed to reduce the loads to prevent excessive fatigue or catastrophic failure. Knowledge of the actual loading to the turbine is also useful for maintenance planning and design improvements.

A prototype smart blade is presented that captures flap deflection and torsional deflection shapes to estimate the loading of the wind over the entire blade. DC type accelerometers are utilized in order to estimate the loading and deflection from both quasi-steady-state and dynamic events. Modal properties were measured for the turbine blade in free-free, cantilevered, and assembled boundary conditions to develop a model for use in estimating the operational forcing functions.

Experimental results showed that blade displacement and rotation could be estimated from steady-state loading using DC accelerometers. Dynamic loading to the turbine blade was also estimated through the use of modal filtering. The results demonstrated that a DC accelerometer sensor array could be used to estimate loads and deflections, which are needed to reduce maintenance costs and enable adaptive control of the blade.

Passive and active damage detection methods applied to a previous fatigue to failure test are also covered as well. In-plane measurements are shown to be sensitive to damage and transverse measurements are useful load estimation. The active method was capable of compensating for temperature changes and then producing an indicative estimate of the damage.

Wind turbines have only recently been considered as applications for smart structure and structural health monitoring technologies. Consequently, the literature available on monitoring and control of wind turbine rotor blades is somewhat limited. A principle area of research has been in the development of actuators for individual blade control. Although no single method has been identified as superior, the objective has been to improve the efficiency of the rotor blades by actively controlling the aerodynamics of the operational turbine. The current blades are designed with varying twist from the root to tip so that the blade has an optimized performance over the most productive wind speeds that are anticipated. The performance of wind turbine rotors is optimized by balancing the increased power available at low occurrence high wind speeds with the decreased power available in high occurrence low wind speeds.

In addition to design of the rotor blade to achieve specific aerodynamic performance, most industrial scale wind turbines have the ability to individually pitch the entire blade thereby additionally changing the performance of the rotor blade. However, turbulent and gust events, which can produce significant rotor damage or produce significant power, have time constants much faster than the pitch rate of the rotor blade. In addition, the average blade length is around 40 meters, and rapidly pitching a blade of this length can create torsional damage.

Many actuators are currently being developed for the control of individual turbine blades at time constants quicker than turbulent and gust wind events. Some of these active rotor blade technologies include: active blade pitch, microtabs, plasma actuators and passive morphing surfaces. In some of these control technologies it is unclear what will be the observed measurement used to determine how to drive the actuators by the control system, or to indicate an assessment of damage in a monitoring system. Various embodiments of the present invention include the use of inertial measurements as a means to estimate both static and dynamic rotor loading.

Some embodiments of the present invention pertain to techniques for estimating the physical static and dynamic loads to a wind turbine rotor blade for use in control algorithms, for use in monitoring systems, and data to be used in design improvements. The static loads are estimated from the elastic deformation of the blade. Dynamic loads are estimated through modal filtering of the dynamic response.

Some embodiments of the present invention pertain to instrumentation systems that can achieve some or all of the following aspects:

(1) Select and integrate a sensing system for passively measuring the static and dynamic response of the blade;

(2) Identify the effects of variability in the environment and boundary conditions over the lifecycle of the blade;

(3) Develop and apply algorithms for loads estimation, modal parameter estimation, operating deflection shape determination, and detection of damage due to changes in the mechanical properties of the blade.

Currently developing technologies for the development of smart rotor blades include viable sensor networks and control actuators. A smart blade with integrated sensors has been designed, fabricated and ground tested that includes accelerometers, strain gages, temperature sensors and fiber optic sensors. One aspect of some embodiments of the present invention pertains to the design of a sensor array that could potentially estimate the loading (L), deflection (δ), and hub forces (F) and moments (M) within the 0-100 Hz range of an operating rotor blade, as shown in FIG. 1a.

FIG. 1a shows a wind turbine 20 according to one embodiment of the present invention. A static support 22 supports above the ground a power unit 24 that includes an electrical generator for converting mechanical power to electrical power. The power unit 24 includes a hub 26 that is rotatable about an axis of rotation 28. A plurality of blades 30 (30a, 30b, and 30c) extend outwardly from hub 26 and are attached to hub 26. In one embodiment, blade 30 is a flexible, rotatable member wind turbine blade attached to hub 26. However, in other embodiments of the present invention the blade (or rotating member) refers to a helicopter blade attached to a hub.

Further, other embodiments of the present invention pertain to the monitoring and measurement of any rotating member, especially those rotating members that are fixed with regards to their attachment to a hub (i.e., the end of the blade cannot translate relative to the hub). In yet other embodiments, there is an assumption about the attachment of the member to the hub that the angle of attachment (the slope going into the hub) does not change as the blade bends. In yet other embodiments, the other end of the rotating flexible member is free to deflect (i.e., it is not pinned to another structure). In yet other embodiments, another assumption regards the free end of the rotating member being unable to resist an applied moment.

Referring again to FIG. 1a, a computer 80 is shown in communication (such as electrical or optical communication) with sensors, and in some embodiments with actuators, of wind turbine 20. In one embodiment, computer 80 includes memory that contains an algorithm for monitoring the health of wind turbine 20. As one example, the algorithm can include the functions 60 or 160 and derivative 70 described later, either as shown or preferably in reduced form. As will be described herein, a real-time measurement made on a blade 30 can be used in the derivative 70 to solve for one or more coefficients of that equation. The algorithm can further take those coefficients and use them in function 60 or 160 to calculate in real-time the loaded geometry of the blade.

In yet other applications, computer 80 can provide a controlling function. In such applications, calculation of the geometric configuration of the blade (and likewise, estimations of wind loading) can be used in implementation of various control strategies.

In various embodiments of the present invention, an accelerometer 40 is attached at a predetermined position (a station) along the length of the blade. In some embodiments, accelerometer 40 is a DC type accelerometers capable of simultaneously measuring both constant and dynamic acceleration over the 0-100 Hz bandwidth of an operating blade rotor. Traditional ICP type accelerometers are capable of measuring dynamic acceleration and less capable of measuring static acceleration because the piezo-electric measurement element eventually will discharge when a constant force (acceleration acting on a proof mass) is applied. Even so, some versions of accelerometer 40 are of the ICP type that have a sufficiently long discharge constant. Yet other embodiments of the present invention include an accelerometer capable of near-DC measurement, especially when the output response is supplemented with a low pass filter or other signal processing.

It is understood that use of the term "DC" does not only refer to completely static measurements, but can also include measurements at very low frequencies (and one embodiment, frequencies less than 10 hertz; in a more preferred embodiments, frequencies less than 1 hertz). The DC MEMS measurement element that was selected for this work uses a strain measurement of a deforming diaphragm that is not susceptible to discharge when a constant acceleration is applied. Various embodiments of the present invention contemplate the use of any type of measurement element capable of providing a signal corresponding to a constant or near-constant acceleration, including velocity measurement devices.

Figure 2:
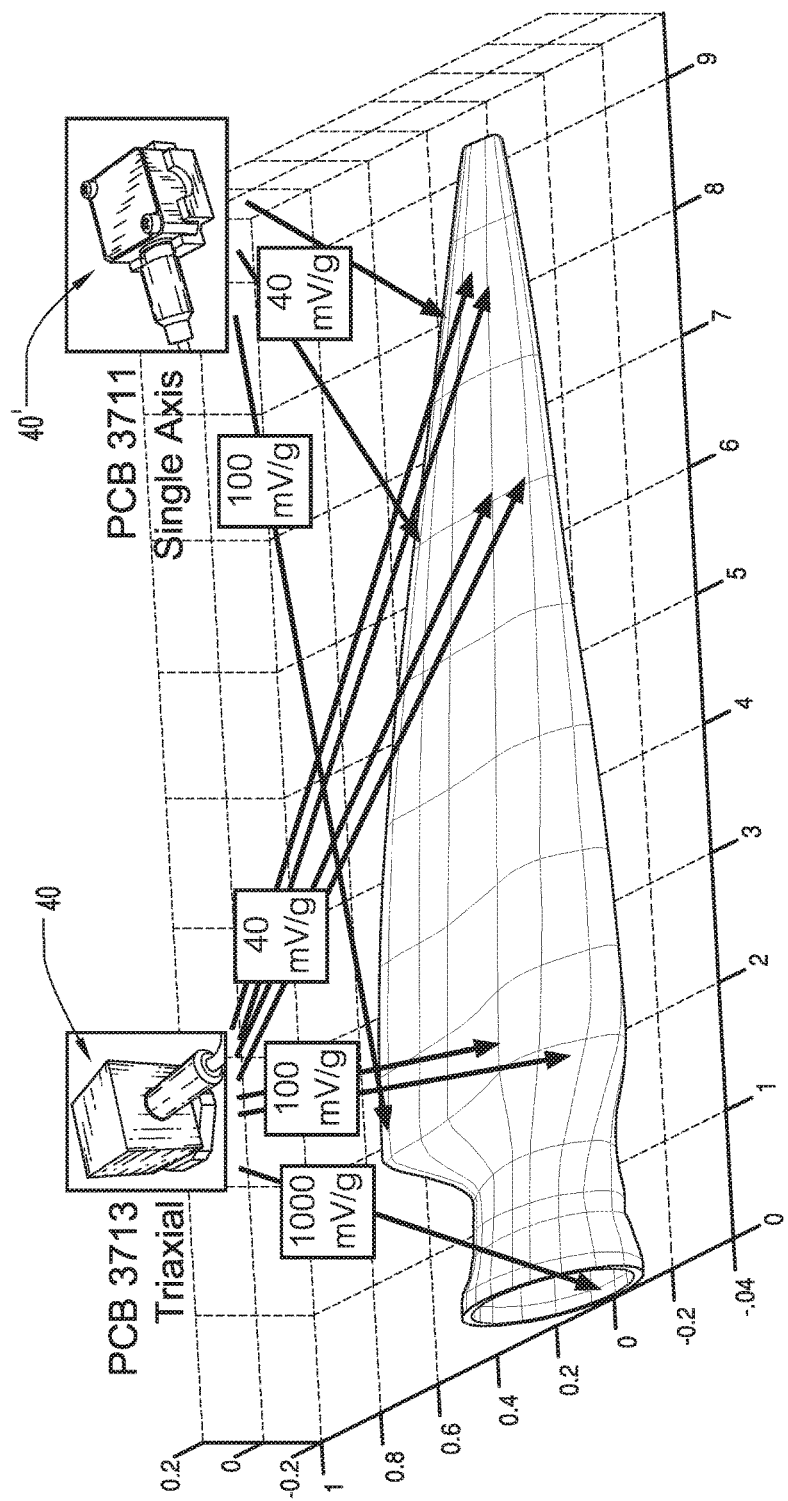
FIG. 2 is a graphical depiction showing the distributed triaxial and uniaxial DC accelerometer sensor array of the blade of FIG. 1c.

DC accelerometers were available in both single axis (PCB 3711) 40' and triaxial (PCB 3713) 40 configurations as shown in FIG. 2. Triaxial sensors were predominantly used in the blade so that the response in the span, lead-lag and flap directions could be measured. Previous work showed that out-of-plane motions were useful for loads and deflection estimation and in-plane measurements were useful for damage detection.

Figure 3:
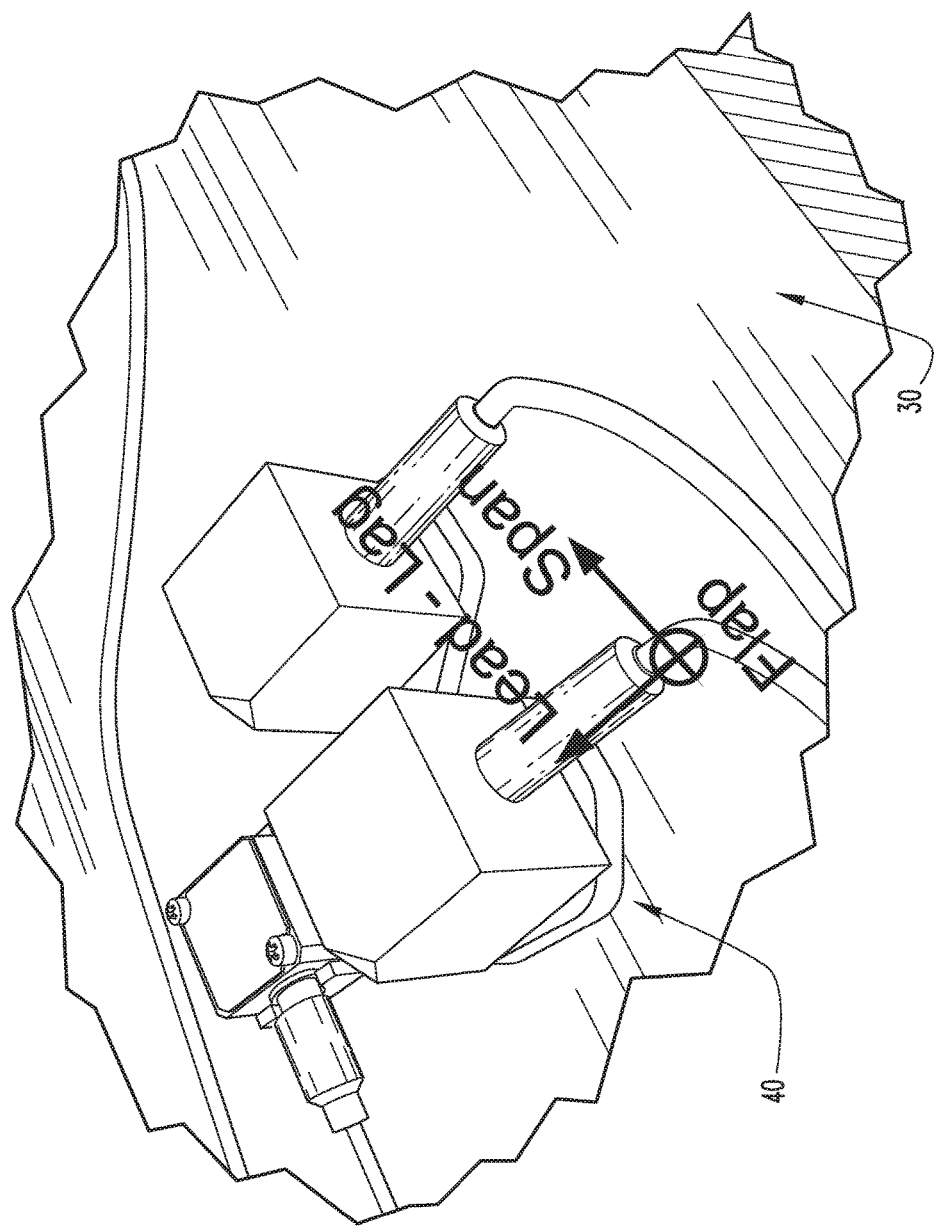
FIG. 3 is a close-up photographic representation of the 8 m station with two triaxial sensors, a uniaxial sensor and a RTD temperature sensor on the blade of FIG. 1c.

The tip of a cantilevered blade is a good sensor location because it observes all blade modes. However, one aspect of some embodiments of the present invention pertains to the installation of sensors within the blade and stations greater than 8 m did not have sufficient interior clearance to fit a triaxial sensor. Instead, the principal sensor location used was the 8 m station at the end of the shear web as shown prior to the final buttoning up of the blade in FIG. 3. At this point, two redundant triaxial sensors were placed in case one failed. A single axis sensor measuring in the flap direction was also placed at the same span-wise distance but shifted toward the trailing edge in the lead-lag direction. The purpose of this sensor was to estimate the rotational response of the blade. If the blade was rotating then the flap measurement of the single axis sensor and triaxial sensor would have been out of phase. If there was no rotation then measurements taken with the two sensors would have been in phase. The sensitivities of the sensors (mv/g) were selected based on the expected magnitude of the centripetal acceleration, likely the largest acceleration of the blade.

Although various types of sensors and specific ways of mounting those sensors are shown and described, it is understood that the present invention is not so limited. In one example, other embodiments of the present invention include the application of sensors (including to but not limited to accelerometers) on the outer surface of a blade. Yet other embodiments pertain to sensors that are small enough to be embedded within the material of the blade.

In the rotor blade, mode shape deflection magnitude was shifted towards the tip where there was decreased stiffness caused by a decreasing cross sectional area in the span direction. By moving the tip group of sensors inboard, some modes were unobservable because the location was situated closer to nodes of vibration. For example, although the 8 m location was sensitive to the first bending mode, it was near a node of the second bending mode, which in turn could not be observed. To overcome this potential deficiency a similar group of sensors was placed at the 6.5 m station as shown in FIG. 2. From previous modal analysis results, the 6.5 m station was near resonances of modes that the 8 m station could not observe. Therefore, at least one of the two groups of sensors observed all of the modes of interest in the 0-100 Hz bandwidth.

Figure 4:
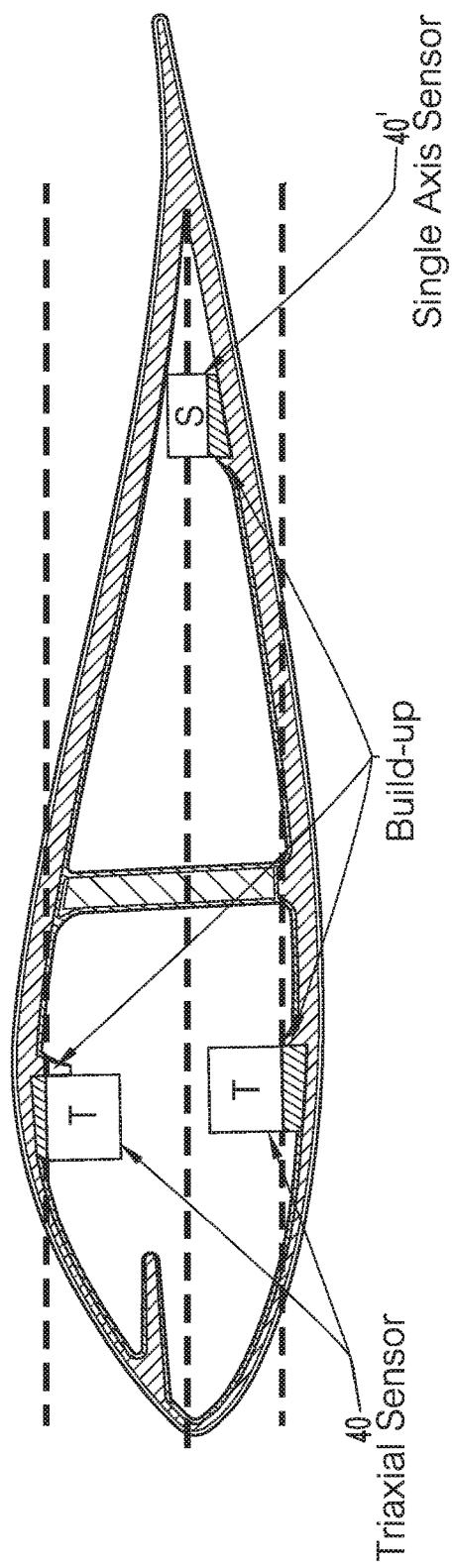
FIG. 4 is a photographic typical cross section of a sensor array of the blade of FIG. 1c.

The 6.5 m group contained two triaxial sensors and a single axis sensor in an arrangement detailed in FIG. 4. This arrangement was used to measure rotation about the span axis and linear motion in all three principal directions. The two triaxial sensors 40 were used to determine if there was a difference of the lead-lag and span in-plane motions between the high-pressure and low-pressure sides due to states of tension and compression, respectively.

Another group of sensors was placed at the 1.74 m station to monitor the motion of the blade at the maximum chord. At this location the generally circular section of the root transitioned to the outboard airfoil section. The transition dominated the mode shapes in this region and was a sensitive measurement of blade operational shape.

A final triaxial sensor was placed in the root close to the hub to monitor the connection interaction. At this connection the loads from the rotor blade were transmitted to the hub and from there onto the drivetrain and other rotor blades. Additionally, the feedback from the other rotor blades, bearings, gearbox and generator all entered the blade at this location. Measurements at this location accounted for the loads that were not caused by the wind and rotation.

The sensor array installed within this blade can be more comprehensive than the sensor array installed on blades according to other embodiments of the present invention. For example, one embodiment of the present invention further includes a blade 30 having a single, two axis accelerometer 40 located at a predetermined location along the length of blade 40 between the hub and the tip. In addition, it is preferable that the measurement device be attached to the blade such that the orientation of the measurement device does not change relative to the blade. Preferably, the two axes of measurement lie generally within the plane of rotation of blades 30. In other embodiments, the axes of the sensors each have a directional component that maps into the plane of rotation. The purpose of the large sensor array was to prove that the following approaches worked and to then determine the minimum sensor requirements for each approach. The minimum sensor requirements would be used to design an industrial sensor array.

Methods and apparatus according to one embodiment of the present invention are capable of being used with the Sandia National Laboratories Micon 65/13 research turbine at the USDA site in Bushland, Tex., shown in FIG. 6a. This turbine was modeled with FAST to investigate fitting tip deflection estimators. The tip deflection was estimated for wind speeds from 1 m/s to 30 m/s and then used to estimate the best coefficients in equation (17) over the entire tip deflection range. The error in tip deflection between the fitted tip estimator and actual tip deflection was used as a metric to compare the different tip estimators.

The Micon 65/13 turbine is a fixed pitch, fixed speed 100 kW turbine. The turbine characteristics are shown in Table 6b. The turbine simulation was run for a period of 200 seconds with a sample rate of 250 Hz. Uniform constant wind loading was applied to the turbine, with simulated wind speeds spaced every 1 m/s between 1 m/s and 30 m/s. The hub-height wind speed, turbine power, blade accelerations and tip deflections were estimated with each simulation. The simulated blade accelerations were in the flap, lead-lag and span directions at span distances of 2 m, 6.5 m and 8 m, which were close to the locations of the sensors installed within the smart rotor blade, presented in FIG. 2.

TABLE 6b

| | |
|---|---|
| 9.6144 | Distance from rotor apex to blade tip (meters). |
| 0.6144 | Distance from rotor apex to blade root (meters). |
| 22 | Tower height (meters). |
| −4 | Rotor shaft tilt (degrees, negative upwards). |
| 4 | Coning angle (degrees, positive downwind). |
| 100 | Rated power (kW) |
| 55 | Constant speed (rpm) |

The following discussion overviews one implementation of rotor blade estimators for quasi-static deflection and loading estimation, modal decomposition for dynamic monitoring of wind turbines, passive damage detection with in plane dynamic displacement measurements, active damage detection using the method of virtual forces, and temperature compensation of frequency response functions of wind turbine rotor blades.

It is beneficial to accurately estimate the static and dynamic loading of wind turbine rotors. However, there are no practical sensors available for directly measuring load. Consequently, a method was needed to merge the measurement of the sensor with a technical approach that could estimate the loading to the rotor. In the following a method is developed assuming that the quasi-static and dynamic acceleration at discrete points along the rotor blade can be measured during operation. The following discussion will describe a novel method for the measurement of blade rotational deformation at each sensor location and the estimation of blade deflection and loading with the local measurement of blade rotation deformation. Additionally, the modal contributions of a dynamically excited rotor blade are tracked by modal filtering for fatigue accumulation. However, it is understood that the discussion herein regarding static and quasi-static measurements and analysis are separate from some of the aspects of dynamic measurement and analysis discussed herein. Although some embodiments of the present invention pertain to monitoring systems that include both static or quasi-static analysis, and also dynamic analysis, yet other embodiments pertain to separate applications of these concepts.

One embodiment of the present invention pertains to the estimation of mean wind loading and the use of an inertial sensor to measure rotor blade deflection and centrifugal acceleration. Various embodiments of the present invention can include any or all of at least three aspects:

(1) The distributed loading of the mean wind and increased velocity wind due to blade rotation cause the blade to elastically curve.

(2) During the curvature of the rotor blade the centripetal acceleration at the reference sensor remains perpendicular to the axis of rotation.

(3) The curvature of the blade causes the surface tangent and normal to rotate.

Figure 5A:
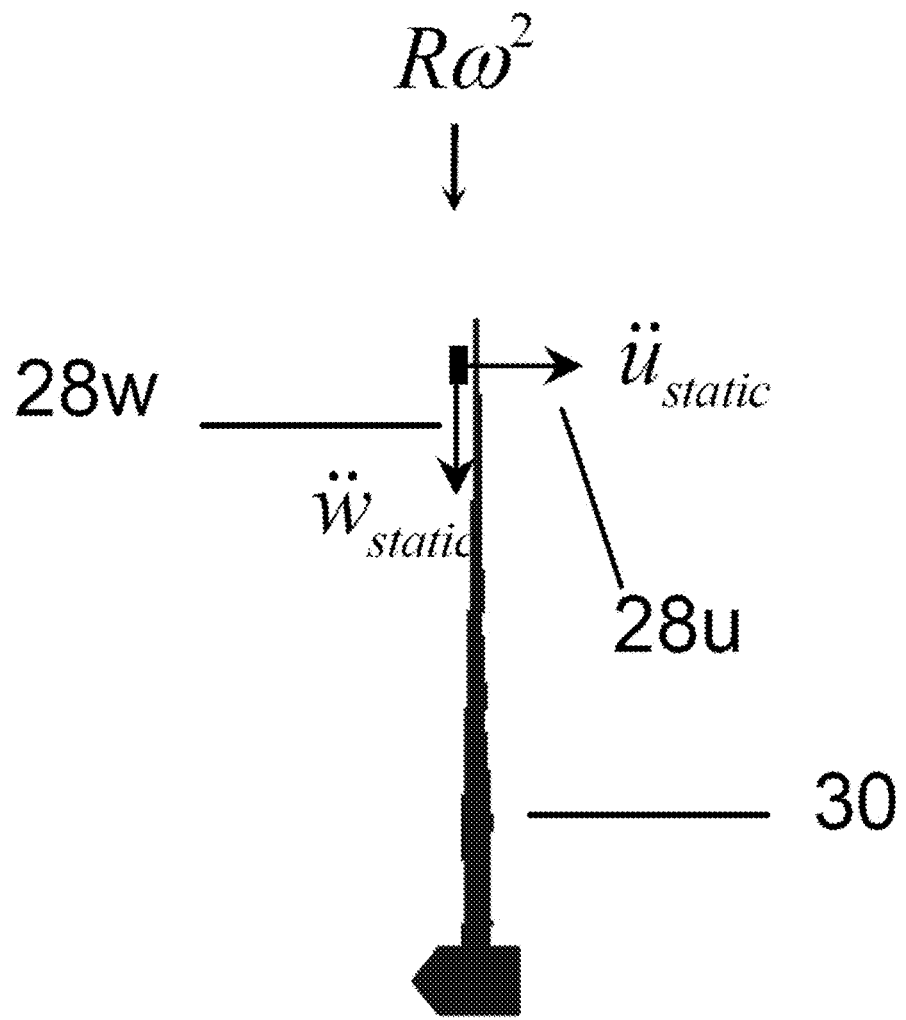
FIG. 5a is a schematic representation of a static blade.
Figure 5B:
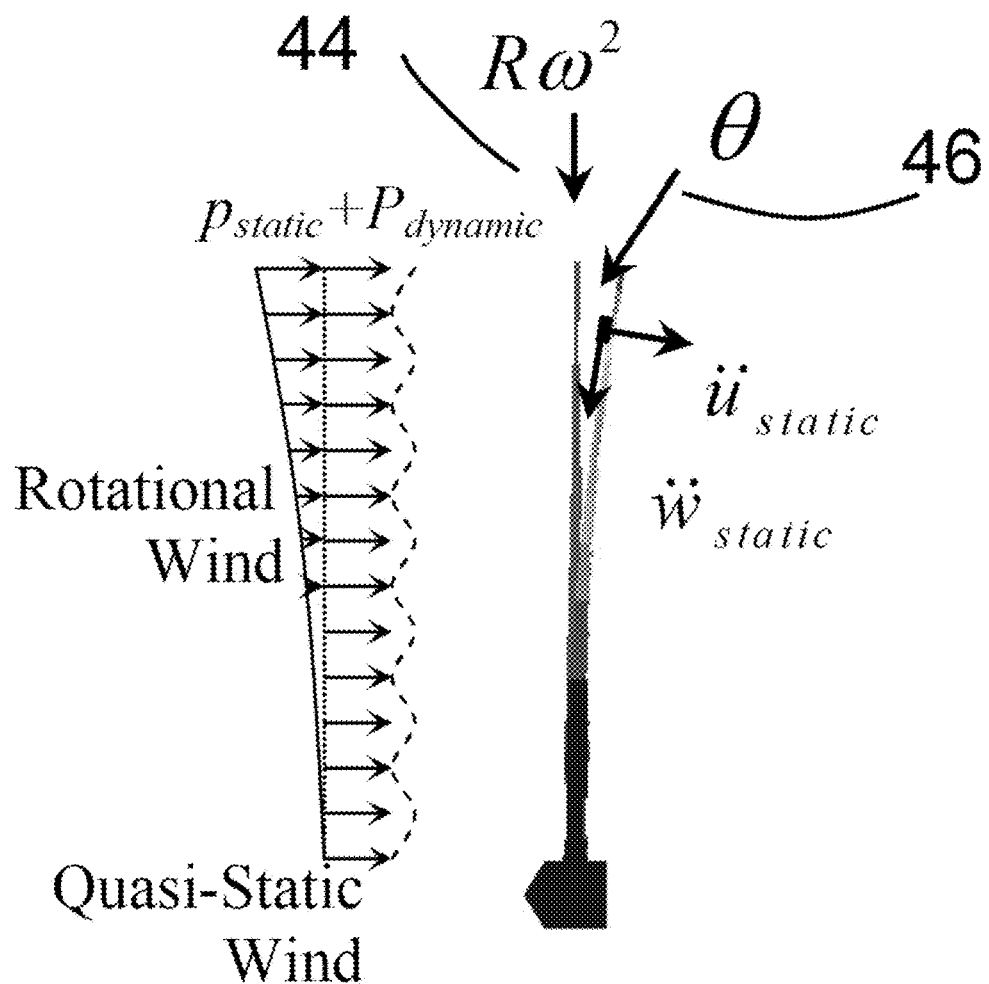
Figure 5C:
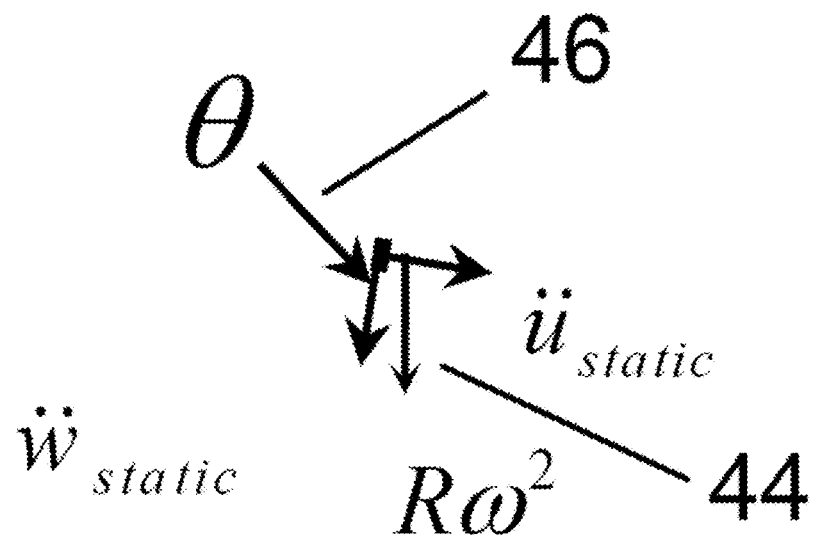
FIG. 5c includes graphical and mathematical representations of the accelerations measured in FIG. 5b, and the relationship of the measured accelerations to the slope of the blade at a point along the length of the blade.

As seen in FIGS. 5B and 5C, the deformation angle 46 (θ) can be estimated from the difference between the centripetal acceleration and the surface mounted reference sensor. The deformation is proportional to the distributed mean loading caused by the wind.

The application of accelerometers to wind turbines has been difficult in previous efforts because the large centripetal acceleration produced from the blade rotation has generally interfered with the desired dynamic accelerations. In this work, centripetal acceleration was used as a strong reference measurement signal for calculating blade deflection. In one embodiment, a multi axis DC accelerometer placed on a blade can provide an inertial reference vector 44. Vector 44 points toward axis of rotation 28, even when blade 30 is deflecting and changing the orientation of the attached accelerometer.

In FIG. 5a, a cantilevered beam is shown with a fixed base and a bi-axial sensor mounted at the tip that measures the inplane and transverse accelerations. A centripetal acceleration component is included from the blade rotating about the x direction at the root, as a function of radius, R, and rotational speed, ω. In FIG. 5b the quasi-static loading, pstatic(z), from steady wind and the dynamic loading, Pdynamic(z,t), from turbulence, wind shear, etc. causes the beam to elastically deform. As the beam deforms, the sensor measurements rotate with the beam. As shown in FIG. 5c, the rotation of the sensor changes with the rotating beam but the direction of the centripetal acceleration does not change. This is because centripetal acceleration is an inertial effect. Therefore, the local rotation of the sensor, and also of the beam at that point, can be estimated from the magnitude of the ratio of the u and w measurements. From this approach DC accelerometers that are capable of measuring constant acceleration can be employed along a wind turbine rotor blade to estimate the local static rotational deformation.

Although rotational speeds and radii of the blade can change, the direction of the centripetal acceleration 44 does not change. The direction of the centripetal acceleration is always directed toward the axis of rotation. This inertial vector 44 can be calculated by a vector summation of the measured accelerations w and u. In one embodiment, one of the measured accelerations is substantially tangent to the surface of blade 30 (z' as shown in FIG. 5c).

When the wind turbine is at rest, the DC component of acceleration measured by accelerometer 40 will be oriented to point toward the center of the gravitational field. However, as the turbine rotates, the centripetal acceleration vector becomes discernable (from a vector summation of other components) and points toward the axis of rotation. As the blade 30 begins to bend, the axis of the attached accelerometer 40 likewise begins to change slope. As best seen in FIG. 5c, the included angle between the centripetal acceleration vector 44 and the tangential acceleration of the attachment point is also the slope of the blade at the attachment point, and thus a function of the load and the deflection of the blade. It should be noted that the centripetal acceleration vector 44 can be compared to any measured axis of acceleration, so long as that direction of measurement is at least partly in the plane of rotation of the blade.

As long as the direction of centripetal acceleration remains constant the sensors always have a reference from which to measure the rotational deformation. Furthermore, the estimate of the rotation is from the ratio of the two signals, u and w, and changing amplitude of centripetal acceleration will affect each of those signals equally. The ratio will remain constant regardless of the differences in the centripetal acceleration magnitude.

Although the local rotation (or slope) of the rotor blade can be acquired, the slope itself was not a quantity that could be exactly related to the wind loading. One embodiment of the present invention pertains to a method developed to produce the deflection and loading along the beam as a function of local slope.

Figure 6:
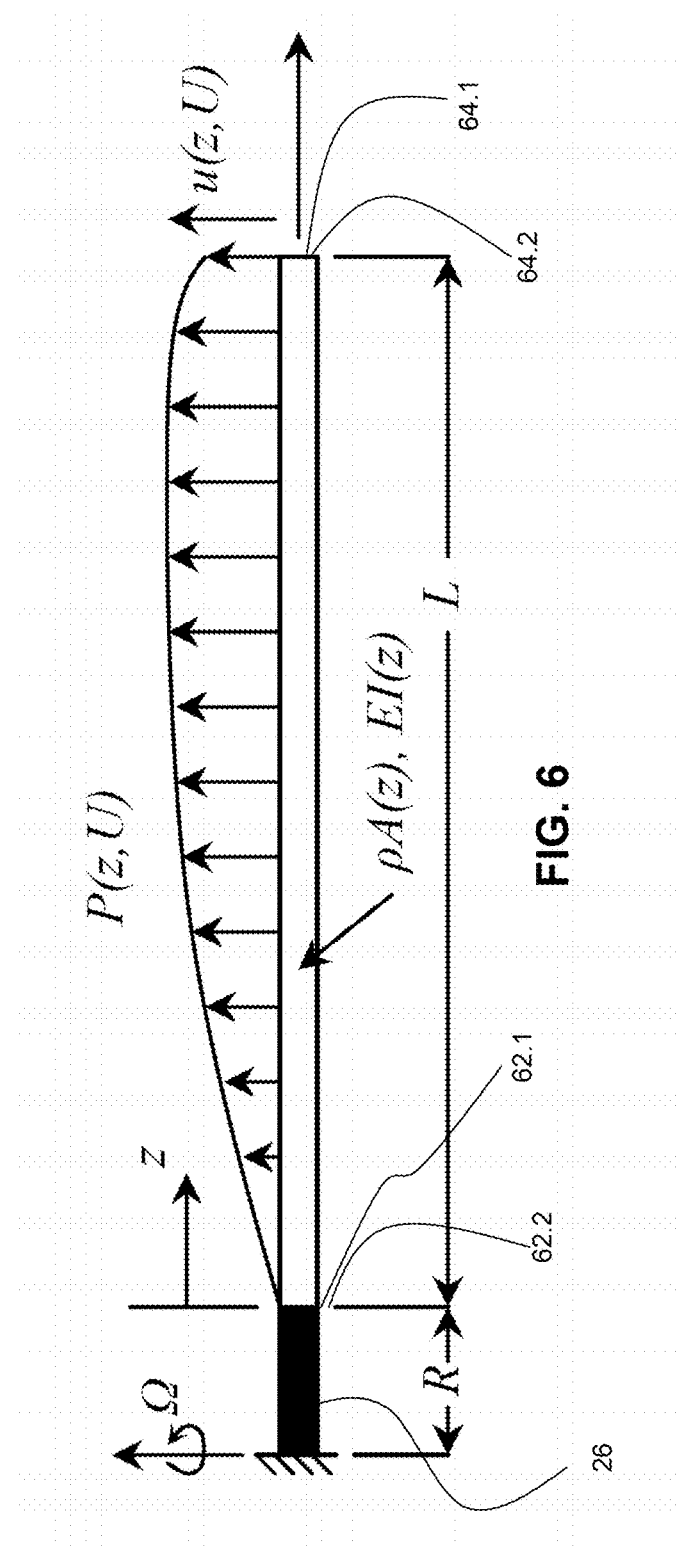
FIG. 6 are a graphical representation of wind loading along the length of a blade from the hub to tip and showing deflection, u, of rotating Euler-Bernoulli beam with a rigid hub caused by the distributed wind loading, W, along the span direction, z, of the rotor blade with bending stiffness El(z) as a function of wind speed, U.

FIG. 6 shows a two dimensional representation of the wind turbine loading problem. A wind turbine rotor is connected to a rigid hub 26, denoted by the distance R. The rotor blade itself is flexible and deformable with, in the case of an Euler-Bernoulli beam, bending stiffness, EI(z), and mass per unit length, m(z), both functions of the span distance, z, and a length, L. The deflection of the blade in the flap direction, u(z,U), is a function of the span distance and mean wind speed, U. The distributed loading applied to the rotor blade is complex in shape and can be defined as a function of span distance and wind speed. The rotational speed of the rotor blade is denoted $\Omega$.

FIG. 6 also shows some aspects of how blade 30 is modeled and analyzed. In one embodiment, blade 30 is attached to hub 26 such that there is no relative translation between the hub and proximate end of blade 30. In this case, hub end condition 62.1 can be stated that the end of blade 30 is attached to hub 26. Further, a simplified condition 62.2 that can be applied to the connection of the hub and the blade is that there is no relative rotation between the hub and the proximate end of the blade, such that the blade is rigidly attached and cannot bend at the junction of hub and blade root.

Yet other simplifying conditions can be applied to the free end of blade 30. One such condition 64.1 is that the free end is free to deflect. Yet another condition 64.2 is that the end of the blade cannot resist a moment. In some embodiments of the present invention, both of the hub end conditions and both of the free end conditions are applied to the modeling analysis that follows. However, yet other embodiments of the present invention do not require all four of these end conditions.

Given the Euler-Bernoulli beam in FIG. 6, Hamilton's variational principle was applied to the potential energy, kinetic energy and loading functions to derive the equation of motion for the beam with constant mass, constant bending stiffness, and rotational stiffening:

$$\rho A \frac{\partial^2 u}{\partial t^2} + EI \frac{\partial^4 u}{\partial z^4} + \frac{1}{2}\rho A \Omega^2 \left(2(R+z)\frac{\partial u}{\partial z} - ((R+L)^2 - (R+z)^2)\frac{\partial^2 u}{\partial z^2}\right) = \quad (1)$$
$$P_{static}(z) + P_{dynamic}(z, t)$$

where all quantities were defined in FIG. 6. For the following discussion only constant loading was assumed so the general static deflection equation of the beam was:

$$EI\frac{\partial^4 u}{\partial z^4} + \frac{1}{2}\rho A \Omega^2 \left(2(R+z)\frac{\partial u}{\partial z} - ((R+L)^2 - (R+z)^2)\frac{\partial^2 u}{\partial z^2}\right) = P_{static}(z) \quad (2)$$

Assuming that the wind loading was defined as a summation of linear combinations of powers of span distance and mean wind speed, the deflection along the beam can take the form of a power series expansion. Therefore one choice for a deflection estimator basis function 60 can take the form of a polynomial power series expansion:

$$\hat{u} = C_0 + C_1 z + C_2 z^2 + C_3 z^3 + C_4 z^4 \ldots + C_n z^n = \sum_{j=0}^{n} C_j z^j \quad (3)$$

where $\hat{u}$ denotes the deflection estimator, z is the span-wise distance as defined in FIG. 6, $C_j$ are the unknown coefficients, and n is the number of terms included in the estimator. Although what has been shown and described is the use of a deflection function 60 in the form of a polynomial series expansion, the present invention is not so limited. Yet other embodiments of the present invention include other types of series expansions, including rotating phasor series expansions and others. Further, the deflection $\hat{u}$ and x' both represent deflection (the latter having been used in FIGS. 5b and 5c).

At first assumptions were made independent of the distributed loading. For example, regardless of the loading condition it was assumed that the rotor blade was fixed at the root and free at the tip, which led to the following boundary conditions, respectively:

$$\hat{u}\big|_0 = 0, \, \frac{d\hat{u}}{dz}\bigg|_0 = 0, \, EI\frac{d^2\hat{u}}{dz^2}\bigg|_L = 0 \quad (4)$$
$$\text{and } EI\frac{d^3\hat{u}}{dz^3}\bigg|_L = 0$$

Substituting these boundary conditions into Equation (3) yielded general solutions for the first four coefficients independent of the number of terms included in the estimator:

$$C_3 = \sum_{j=4}^{n} -\frac{1}{6}j(j-1)(j-2)(L)^{j-3}C_j \quad (5)$$
$$C_2 = \sum_{j=4}^{n} \frac{1}{2}j(j-1)(j-3)(L)^{j-2}C_j$$
$$C_1 = 0$$
$$C_0 = 0$$

This showed that the first four coefficients in the estimator 60 were dependent on the boundary conditions 62.1, 62.2, 64.1, and 64.2. To utilize the measurement of local rotor blade deformation rotation as detailed in the previous section, the estimator should have at least five terms. However, the present invention also contemplates those embodiments in which other types of series are utilized and different boundary conditions (at the hub and free end) are utilized, such that the resultant estimator can have a different number of terms and different types of terms.

In one embodiment, the derivative of estimator 60 is taken with regards to the position along the blade, which by definition is the slope along the blade. To include the local slope estimate from the sensor, a condition was set such that at the sensor location the true rotor blade slope was the same as the slope of the estimator:

$$\left. \frac{d\hat{u}}{dz} \right|_{z_1,\ldots} = \left. \frac{\partial u}{\partial z} \right|_{z_1,\ldots} = \quad (6)$$

$$\sum_{j=4}^{n} \left\{ j(j-1)(j-3)L^{j-2}z - \frac{1}{2}j(j-1)(j-2)L^{j-3}z^2 + jz^{j-1} \right\} \bigg|_{z_1,\ldots}$$

$$\underbrace{\phantom{xxxxxxxxxxxxxxxxxxxxxxxxxxxxxxxxxxxxxxxxxxxxxxxxxxx}}_{C_j}$$

$$\left. \frac{d\hat{u}}{dz} \right|_{z_1,\ldots} = \sum_{j=4}^{n} g(L, z, j) C_j \bigg|_{z_1,\ldots}$$

where u is the actual displacement of the beam and $z_1$, $z_2$, . . . are the sensor locations. The two terms on either side of the first, left-most equality of relationship (6) indicates an assumption that the slope of blade 30 predicted by estimator 60 is equal to the actual slope of blade 60. The right side of the second equality within equation (6) is the derivative 70 of estimator 60.

The first two coefficients of this expression were already defined in terms of coefficients greater than n=3. Referring to equation (6), the measured slope can be substituted onto the left-hand side of equation (6). It is now possible, with this measured slope, to calculate the remaining coefficients C.

Now that the remaining unknowns of estimator 60 have been determined, it is possible to substitute those coefficients into equation (6), along with values of z and j, and the deflection of the blade u can be calculated. From this equation an estimator 60 resulted with coefficients that included the boundary conditions and the restriction that the slope condition was satisfied at each sensor location. The deflection estimator was now fully defined, excluding where to properly position the sensor measurements.

To optimize the sensor placement the error between the deflection estimator and actual deflection had to be minimized. The error, E, between these two functions over the rotor span (z=0 to L) was defined as:

$$E = \int_{z=0}^{L} [u(z) - \hat{u}(z)]^2 w(z) dz = E(U, z_1, z_2, \ldots) \quad (7)$$

where w(z) is an estimate of static loading. The resulting error equation is a function of sensor location(s) and wind speed. Minimums in this function represented optimal locations of sensors for a given wind speed. An error function can be used to design a blade monitoring system and provide the optimal estimate of blade deflection and loading in the most critical wind regions. Since the blades can be manufactured with the sensors included, the selection of sensor locations can be performed prior to operation.

The fourth derivative of the deflection estimator, which is a function of the fourth and higher coefficients, is an estimate of the distributed loading $$EI \frac{d^4 \hat{u}}{dz^4} = EI \sum_{j=4}^{n} j(j-1)(j-2)(j-3) z^{j-4} C_j = \hat{W}(z) \quad (9)$$

This section has shown how a slope measurement along the blade, although not directly related to the loading and deflection, can be implemented in a manner to estimate the deflection and loading along the rotor blade by optimizing the sensor location.

The general approach with regards to multiple sensors is to either use multiple sensors to better estimate $C_4$ or to expand the estimator equation to include more degrees of freedom/curvature. For the case of producing a better estimate of $C_4$, the solution would be expanded row wise:

$$C_4 = \begin{bmatrix} 12L^2 z_1 - 12L z_1^2 + 4z_1^3 \\ 12L^2 z_2 - 12L z_2^2 + 4z_2^3 \\ 12L^2 z_3 - 12L z_3^2 + 4z_3^3 \end{bmatrix}^+ \left\{ \begin{array}{c} \left. \frac{\partial u}{\partial z} \right|_{z_1} \\ \left. \frac{\partial u}{\partial z} \right|_{z_2} \\ \left. \frac{\partial u}{\partial z} \right|_{z_3} \end{array} \right\} \quad (11)$$

and a least squares/pseudo-inverse (+) approach would be used to calculate the coefficient.

An example of a two sensor deflection estimator is:

$$\hat{u}(z) = (6L^2 z^2 - 4L z^3 + z^4) \frac{1}{4} \frac{(3L^2 z_1 - 3L z_1^2 + z_1^3) \left. \frac{\partial u}{\partial z} \right|_{z_1} + (3L^2 z_2 - 3L z_2^2 + z_2^3) \left. \frac{\partial u}{\partial z} \right|_{z_2}}{(3L^2 z_1 - 3L z_1^2 + z_1^3)^2 + (3L^2 z_2 - 3L z_2^2 + z_2^3)^2} \quad (12)$$

where the sensor location is used to weight each slope contribution and the estimator becomes a multivariate optimization problem. This problem would also include symmetry as the optimal sensor location is valid regardless of which optimal location is assigned to each sensor. Additionally the degree of the estimator (n) could be increased by one for each sensor added and then the matrix in Equation (10) would be expanded column-wise with a column for each new coefficient of the estimator. The coefficients in Equation (5) were formulated in a summation notation to reduce the difficulty in expanding this matrix column-wise.

Figure 7A:
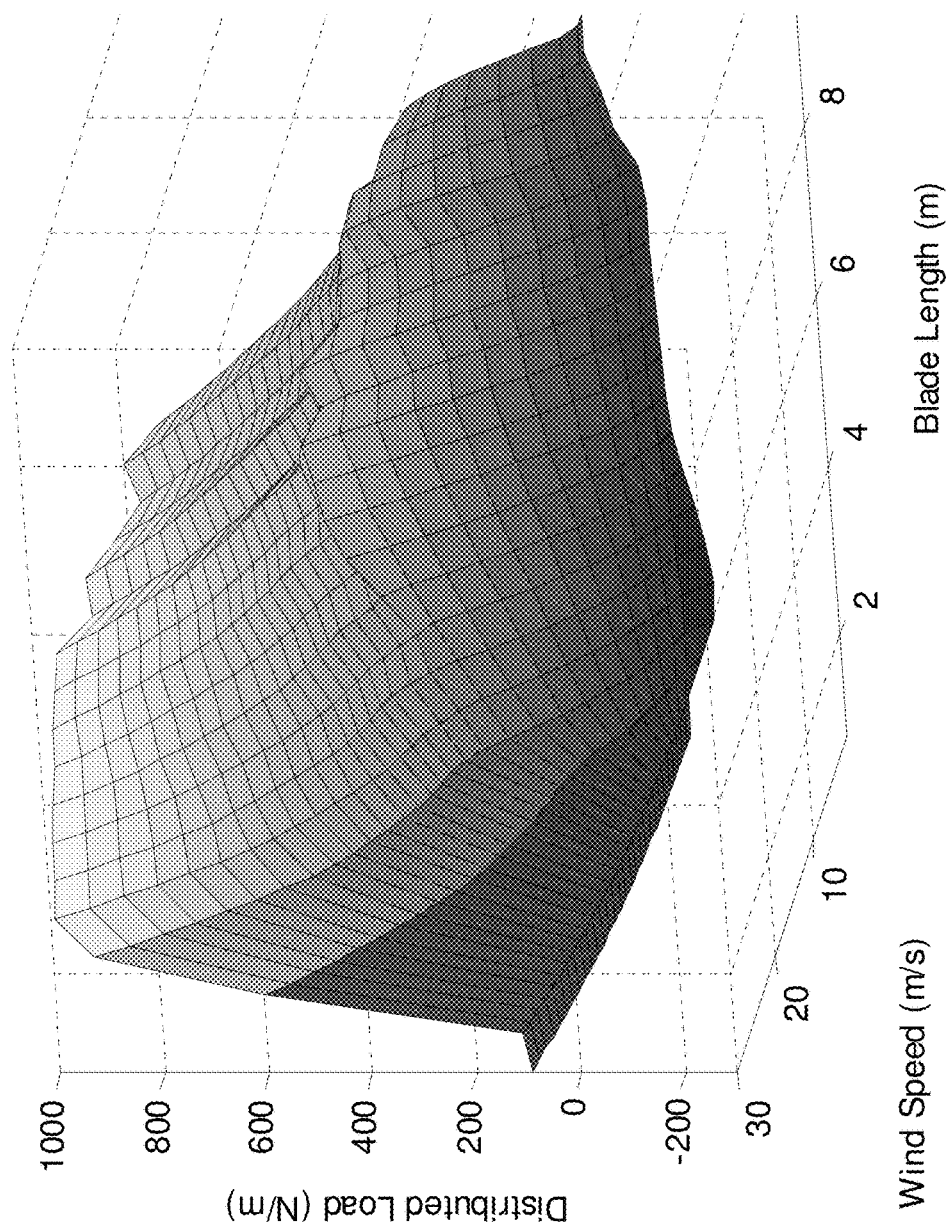
FIG. 7 are graphical representations pertaining to blade loading as follows: (a) actual flap-wise distributed loading on CX-100 blade across the blade span for wind speeds from 1-30 m/s as predicted by FAST; (b) estimated distributed loading from simplified model derived using SAS©; and (c) difference between actual and estimated distributed loading.

The Fatigue, Aerodynamics, Structures, and Turbulence Code (FAST) was used to estimate realistic loading to a CX-100 rotor blade for an illustrative example of the methods proposed. FAST is a free software program provided by the National Renewable Energy Laboratory for the analysis of wind turbines. A model was built, as previously reported, to predict the loading to an operating CX-100 blade attached to a Micon 65/13 wind turbine in steady wind loading. The distributed loading in the flap direction is shown in FIG. 7a, where it is plotted along the blade length from low to high wind speeds. This plot shows that the loads increase linearly along the rotor blade up to around 10 m/s after which the blade enters the stall region. In this region drag and turbulence dominate leading to the highest loads in the widest portions of the blades between 2 and 5 m.

Figure 7B:
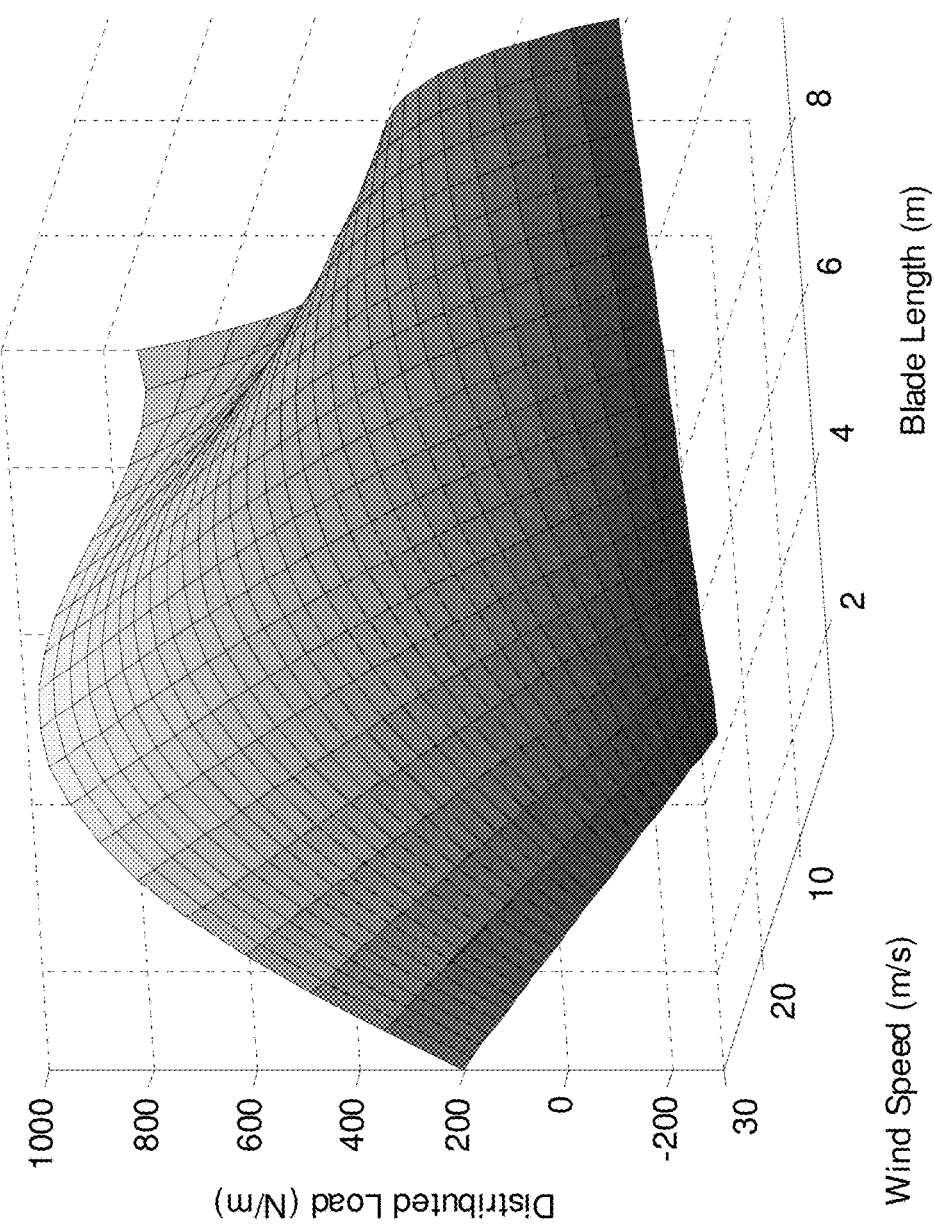
Figure 7C:
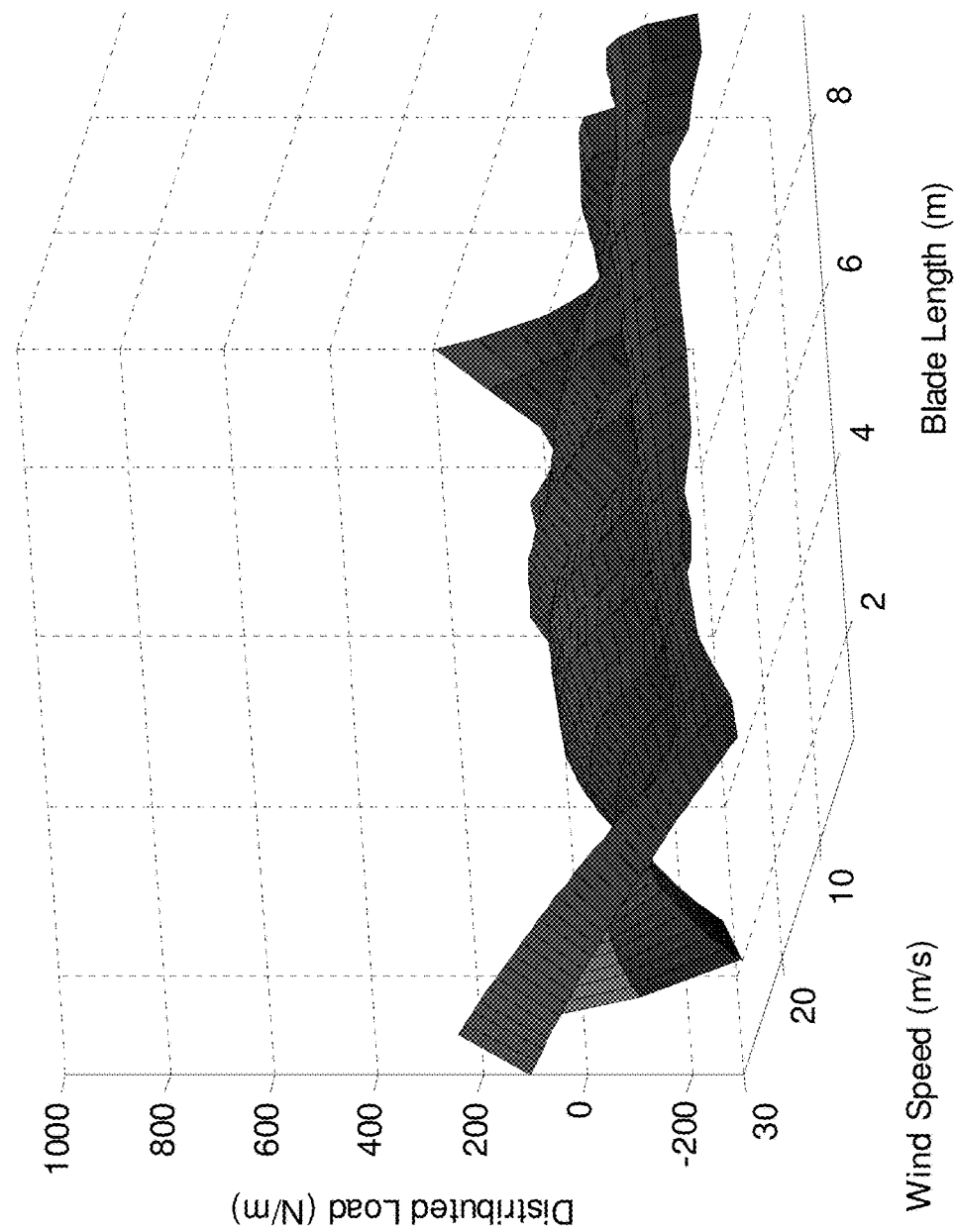

The distributed loading was analyzed with a statistical software package, SAS©, to develop a linear regression model considering independent and linear combinations of wind speed and span distance up to sixth powers. The linear model, shown in FIG. 7b, that resulted is:

$$P_{flap}(z, U) = b_1 U z + b_2 U^2 z^3 + b_3 U^3 z^4 + b_0 \quad (13)$$

where W is the flap distributed loading, U is the wind speed, z is the span distance and the coefficients are:

$$b_1 = 11.823 \frac{\text{kg}}{\text{m}^2\text{s}}, b_2 = -9.6473 \times 10^{-3} \frac{\text{kg}}{\text{m}^5}, \quad (14)$$

$$b_3 = 2.2305 \times 10^{-5} \frac{\text{kg} \cdot \text{s}}{\text{m}^7} \text{ and } b_0 = -89.542 \frac{\text{N}}{\text{m}}$$

Table 1 shows the statistical analysis of variance results for this model with only three degrees of freedom. The total sum of square is a measure of the variation in the data and the model sum of squares is the amount of variation that can be accounted for by Eq. (13). The model was able to account for 94.5% of the total variation of the actual distributed loading.

TABLE 1

Linear regression model results from SAS, showing 3 DF model accounted for 94.5% of the variation.

| Source | DF | Sum of Square |
|---|---|---|
| Model | 3 | 42770837 |
| Error | 596 | 2500635 |
| Total | 599 | 45271472 |

Figure 8A:
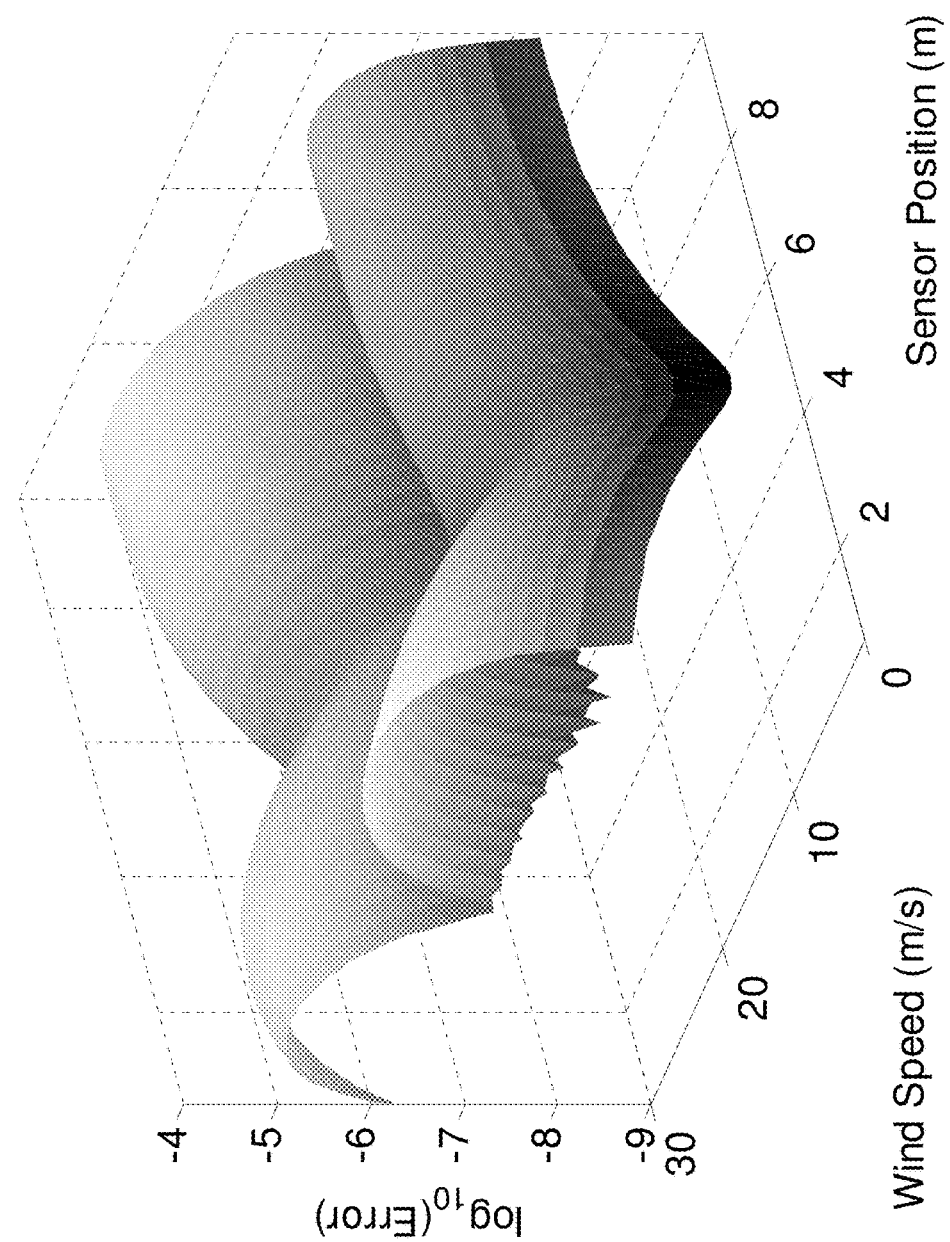
FIG. 8 are graphical representations pertaining to error calculations as follows: (a) error surface for CX-100 realistic loading case as a function of wind speed and sensor position; and (b) error function integrated over wind range zero to thirty meters per second showing the overall optimal sensor location at 5.0 meters.

This function for distributed loading was used to calculate the deflection along a beam of constant bending stiffness, mass density and zero rotational speed:

$$u = \frac{1}{EI}\left[\frac{1}{120}b_1 U z^5 + \frac{1}{840}b_2 U^2 z^7 + \right. \quad (15)$$

$$\left. \frac{1}{1680}b_3 U^3 z^8 + \frac{1}{24}b_0 z^4 + \frac{1}{6}C_1 z^3 + \frac{1}{2}C_2 z^2\right]$$

$$C_1 = -\frac{1}{2}b_1 U L^2 - \frac{1}{4}b_2 U^2 L^4 - \frac{1}{5}b_3 U^3 L^5 - b_0 L$$

$$C_2 = -\frac{1}{6}b_1 U L^3 - \frac{1}{20}b_2 U^2 L^5 - \frac{1}{30}b_3 U^3 L^6 - \frac{1}{2}b_0 L^2 - C_1 L$$

where the complex loading resulted in eighth order span terms. From the true deflection equation with nonzero inner radius, the deflection estimator is preferably designed for the application of a single sensor. FIG. 8a illustrates the error that results from this deflection estimator as a function of sensor position and wind speed. This plot illustrates more complex features as those previously given, although a minimum error "valley" can be clearly seen near a sensor position of 5 m across all wind speeds.

Figure 8B:
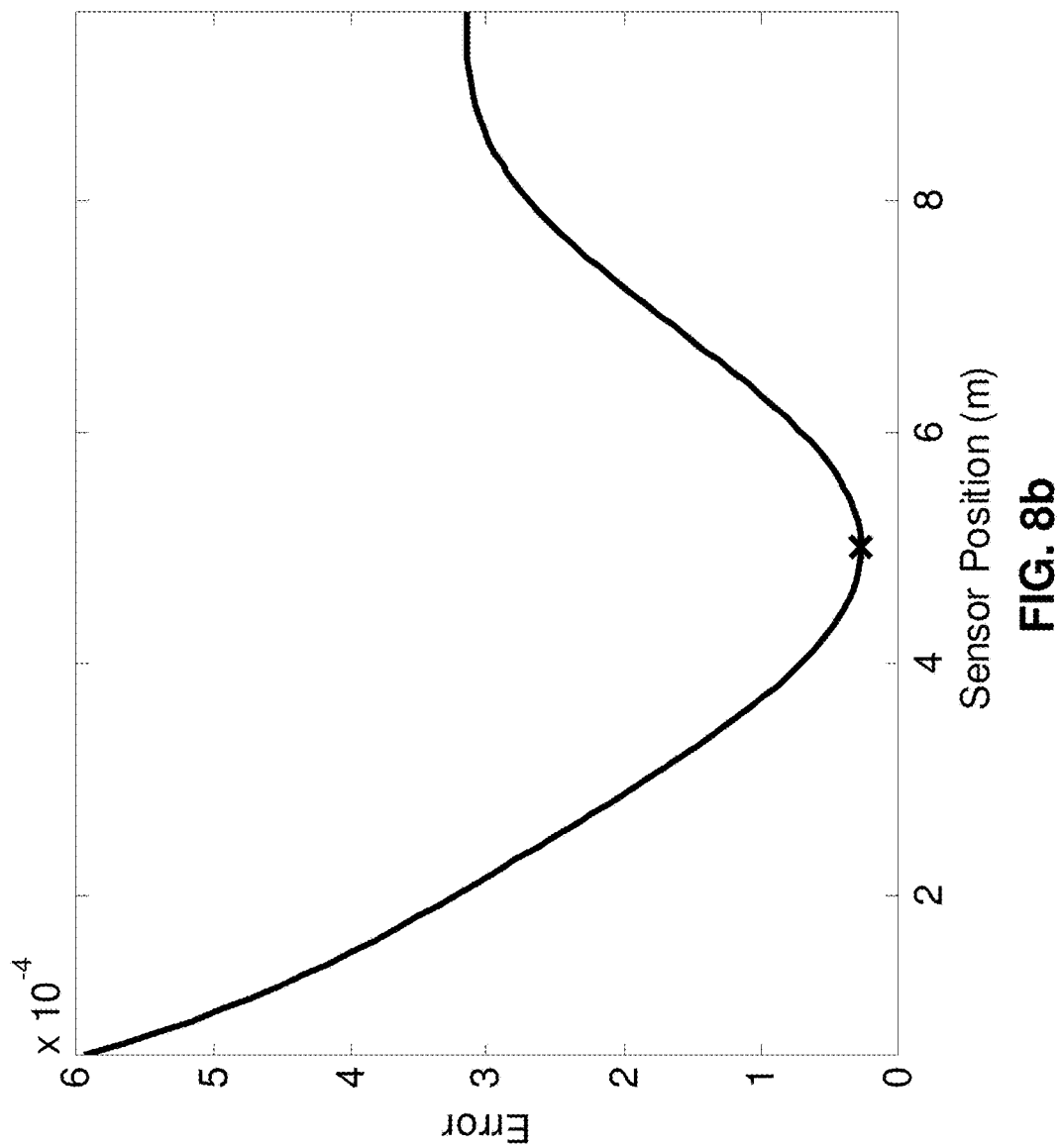

One method to verify this observation and estimate a numerical value for the sensor position that minimizes the error, was to integrate the error function across all wind speeds to get error as a function of sensor position alone, as shown in FIG. 8b. This function suggests that a sensor placement at 5 m was the optimal sensor location for the deflection estimate. It is also important to note that in this case the error was integrated across all wind speeds, but in some cases it may be more important to minimize the error in narrow bands of wind speeds or by weighting multiple wind speed bandwidths differently. There is no obstacle to selecting optimal sensor placement with different criteria; however, this method provides the guidance with which to optimize the sensor location regardless of the specific criteria.

Figure 9A:
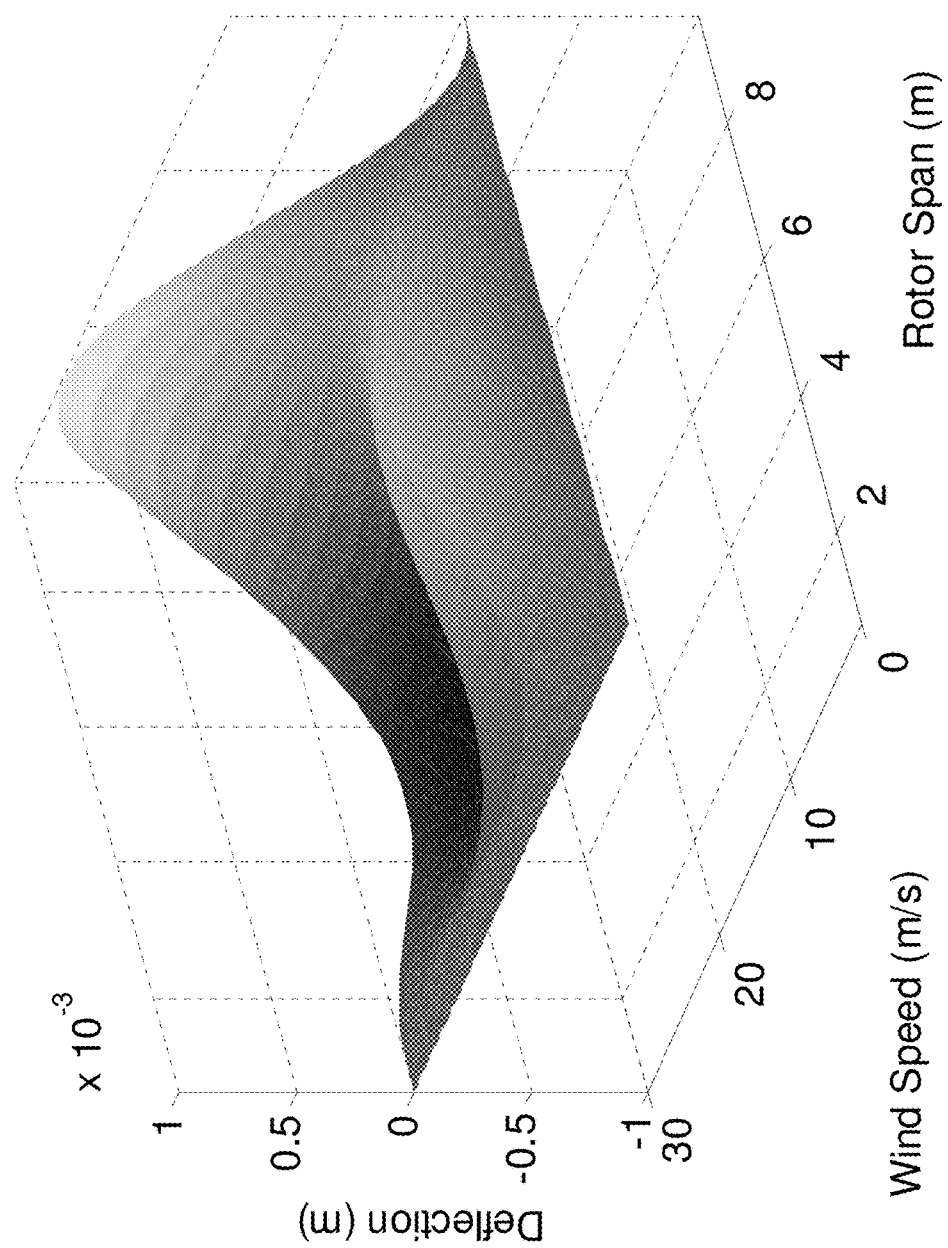
FIG. 9 are graphical representations pertaining to blade deflection and blade loading as follows: (a) difference between true rotor blade deflection and estimated rotor blade deflection in meters as a function of rotor span and wind speed; and (b) estimated rotor blade distribute loading as a function of wind speed and rotor span.
Figure 9B:
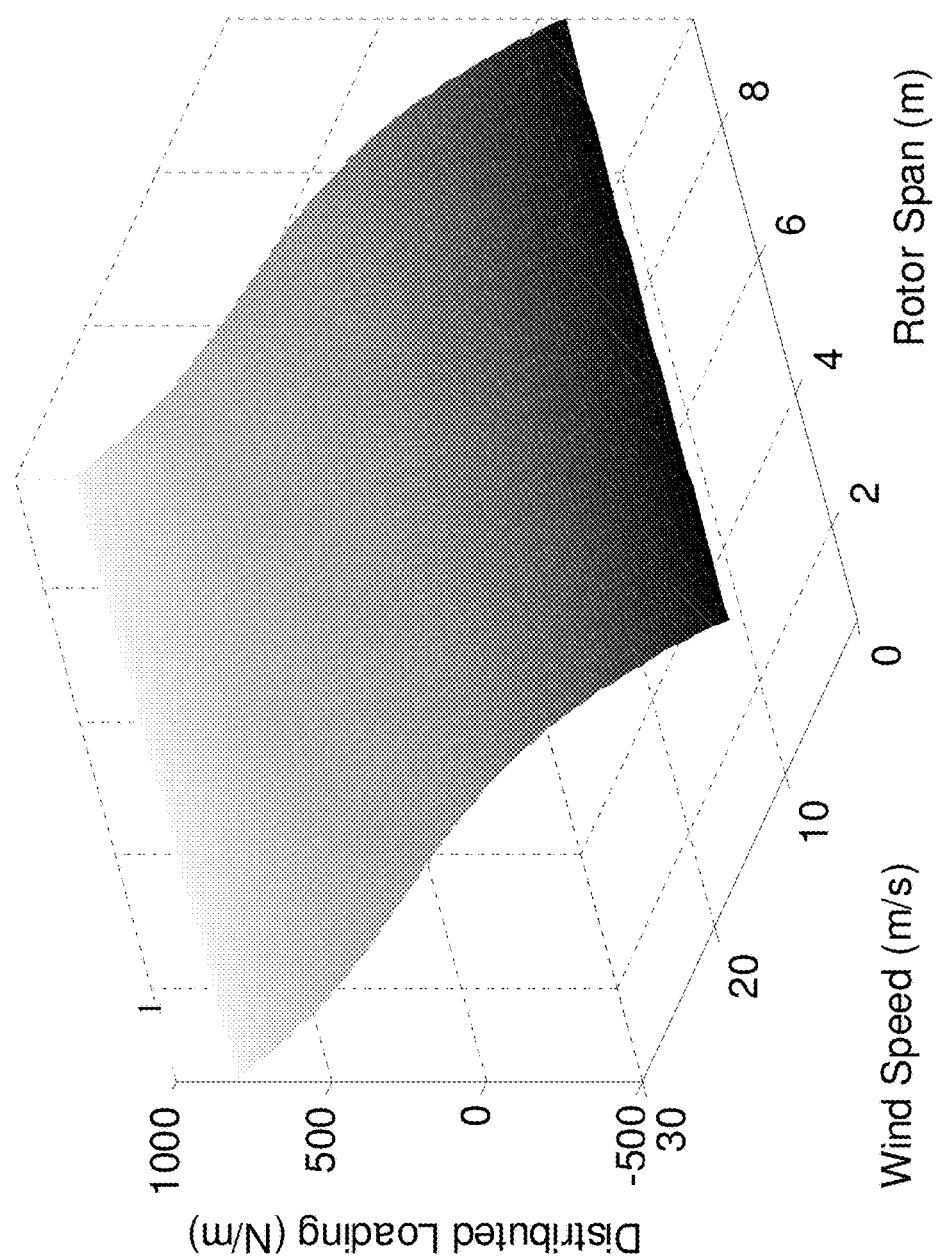

An optimized deflection estimator was compared with the actual deflection as a function of span position and wind speeds. The difference between these two functions is shown in FIG. 9a. This figure shows that the deflection estimator over predicts the tip displacement and under predicts the mid-span deflection at higher wind speeds. Higher curvature is expected at higher wind speeds based on the distributed loading function. The maximum deflection error of 0.001 m was only 0.5% percent of the deflection at that point. As discussed in Equation (9) the deflection estimator could also predict the distributed loading as shown in FIG. 9b. The loading distribution compared favorably with FIG. 7a, especially when considering that for a single sensor estimator the only term remaining in the estimator after the fourth derivative was C4.

In another embodiment of the present invention, a deflection estimator basis function 160 includes a set of linearly independent equations was derived that could be easily adapted for any combination of data available and sensor measurements. The general equation of tip deflection for fitted data with an indefinite number of linear expansion terms of rotation (m) and sensor locations (n) was:

$$\delta_{tip} = \{\theta_1 \; \theta_1^2 \; \ldots \; \theta_1^{n_1}\}_{1 \times n_1} \begin{Bmatrix} C_{1,1} \\ C_{2,1} \\ \vdots \\ C_{n_1,1} \end{Bmatrix} + \quad (16)$$

$$\{\theta_2 \; \theta_2^2 \; \ldots \; \theta_2^{n_2}\}_{1 \times n_2} \begin{Bmatrix} C_{1,2} \\ C_{2,2} \\ \vdots \\ C_{n_2,2} \end{Bmatrix} \ldots + \{\theta_m \; \theta_m^2 \; \ldots \; \theta_m^{n_m}\}_{1 \times n_m} \begin{Bmatrix} C_{1,m} \\ C_{2,m} \\ \vdots \\ C_{n_m,m} \end{Bmatrix}$$

where $\delta_{tip}$ was the tip deflection in units of length, $\theta_m$ was the rotation of the sensor at location m, and $C_{n,m}$ is the coefficient of $\theta^1$ for rotation at sensor location m. Note that this equation could be adjusted for any number of sensor locations and for different expansion terms for each sensor.

To solve for the coefficients, equation (16) was formed into a matrix for p data sets that related deflection and sensor rotation measurements:

$$\begin{Bmatrix} \delta_1 \\ \delta_2 \\ \vdots \\ \delta_p \end{Bmatrix} = \begin{bmatrix} \theta_{1,1} & \theta_{1,1}^2 & \cdots & \theta_{1,1}^{n_1} & \theta_{1,2} & \theta_{1,2}^2 & \cdots & \theta_{1,2}^{n_2} & \cdots \\ \theta_{2,1} & \theta_{2,1}^2 & \cdots & \theta_{2,1}^{n_1} & \theta_{2,2} & \theta_{2,2}^2 & \cdots & \theta_{2,2}^{n_2} & \cdots \\ \vdots & \vdots & \ddots & \vdots & \vdots & \vdots & \ddots & \vdots & \cdots \\ \theta_{p,1} & \theta_{p,1}^2 & \cdots & \theta_{p,1}^{n_1} & \theta_{p,2} & \theta_{p,2}^2 & \cdots & \theta_{p,2}^{n_2} & \cdots \end{bmatrix} \quad (17)$$

$$\begin{vmatrix} \theta_{1,m} & \theta_{1,m}^2 & \cdots & \theta_{1,m}^{n_m} \\ \theta_{2,m} & \theta_{2,m}^2 & \cdots & \theta_{2,m}^{n_m} \\ \vdots & \vdots & \ddots & \vdots \\ \theta_{p,m} & \theta_{p,m}^2 & \cdots & \theta_{p,m}^{n_m} \end{vmatrix} \begin{Bmatrix} C_{1,1} \\ \vdots \\ C_{n_1,1} \\ \vdots \\ \overline{C_{1,m}} \\ \vdots \\ C_{n_m,m} \end{Bmatrix}$$

In this formulation all rotation information was included in a single matrix and all deflection measurements were contained in a vector. Equation (17) was written in a compact form as follows:

$$\{\delta\}_{p \times 1} = [\theta]_{p \times N} \{C\}_{N \times 1} w/N = (n_1 + n_2 + \ldots n_m) \quad (18)$$

The pseudo-inverse was used to obtain the least squares estimate for the coefficients C:

$$\{C\}_{N\times 1} = (([\theta]_{N\times p}^T [\theta]_{p\times N})_{N\times N}^{-1} [\theta]_{N\times p}^T)_{N\times p} \{\delta\}_{p\times 1} \quad (19)$$

For the case of p>N, equation (16) was an over-determined problem because there were more measurements of deflection and rotation than the number of coefficients to be estimated. Conversely for the case of p<N, more coefficients were estimated than independent deflection and rotation measurements available. In application due to constraints of time and effort, only a certain number of deflection and rotation measurements were available that limited the number of coefficients that were effectively estimated in equation (17).

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of predicting the deflection of a wind turbine blade operating in a wind, comprising:
   providing the wind turbine blade having two ends and a length therebetween with one end attached to a rotatable hub, an actuator for controlling the wind turbine blade, a controller in communication with the actuator, and an accelerometer attached to the wind turbine blade at a predetermined station along the length;
   expressing the lateral deflection of the wind turbine blade as a function of the length of the wind turbine blade;
   rotating the wind turbine blade by the wind about the hub;
   measuring the acceleration of the wind turbine blade with the accelerometer during said rotating;
   using the measured acceleration and establishing an inertial reference with the measured acceleration;
   using the inertial reference and the function to predict the deflection of the wind turbine blade; and
   controlling the wind turbine blade with the actuator by the controller using the predicted deflection.

2. The method of claim 1 wherein the one end is attached to the hub such that the slope of the wind turbine blade at the hub is about zero during said rotating.

3. The method of claim 1 which further comprises converting the measured acceleration by at least one of time-based filtering or numerical scaling.

4. The method of claim 1 which further comprise converting the measured acceleration to a variable within a derivative of the function.

5. The method of claim 4 wherein the accelerometer is a two-axis accelerometer, and the measured acceleration is converted to an angle.

6. The method of claim 1 wherein the function is a series expansion having an order greater than 1.

7. The method of claim 1 wherein the function is a series expansion.

8. The method of claim 7 wherein the series is a polynomial series.

9. The method of claim 8 wherein the series has an order greater than two.

10. The method of claim 9 wherein the accelerometer is a first accelerometer and said providing includes a second accelerometer attached to the wind turbine blade at a different predetermined station, said measuring includes responses from the first accelerometer and the second accelerometer, which further comprises:
    measuring the acceleration of the wind turbine blade with the second accelerometer during said rotating;
    wherein establishing an inertial reference is with the measured first acceleration and the measured second acceleration.

11. The method of claim 7 wherein the series is a series of rotating phasors.

12. The method of claim 1 which further comprises taking a derivative of the function with respect to length, and wherein said using the measured acceleration includes using the derivative.

13. The method of claim 1 wherein the length of the wind turbine blade extends in a direction substantially orthogonal to the rotational axis of the hub.

14. The method of claim 1 which further comprises using the predicted deflection to estimate the wind loading on the wind turbine blade.

15. The method of claim 1 wherein the predicted deflection is used to estimate damage to the wind turbine blade.

16. The method of claim 15 wherein said measuring the acceleration is at frequencies below about one hertz.

17. The method of claim 1 wherein the accelerometer is a two-axis accelerometer, and the measured acceleration is converted to an angle.

18. The method of claim 1 wherein the accelerometer is a first accelerometer and said providing includes a second accelerometer attached to the wind turbine blade at a different predetermined station, said measuring includes responses from the first accelerometer and the second accelerometer, which further comprises:
    measuring the acceleration of the wind turbine blade with the second accelerometer during said rotating;
    wherein establishing an inertial reference is with the measured first acceleration and the measured second acceleration.

19. The method of claim 1 wherein said measuring the acceleration is at frequencies below about ten hertz.

20. The method of claim 1 wherein said measuring the acceleration is at frequencies below about one hertz.

21. The method of claim 1 wherein measuring the acceleration is tangent to the surface of the wind turbine blade.

22. The method of claim 1 wherein the other end of the wind turbine blade is free.

* * * * *